US012673348B2

(12) United States Patent
Quanci

(10) Patent No.: US 12,673,348 B2
(45) Date of Patent: Jul. 7, 2026

(54) SYSTEMS, DEVICES AND METHODS FOR SCREENING INDUSTRIAL PRODUCTS

(71) Applicant: SUNCOKE TECHNOLOGY AND DEVELOPMENT LLC, Lisle, IL (US)

(72) Inventor: John Francis Quanci, Haddonfield, NJ (US)

(73) Assignee: SUNCOKE TECHNOLOGY AND DEVELOPMENT LLC, Lisle, IL (US)

(*) Notice: Subject to any disclaimer, the term of this patent is extended or adjusted under 35 U.S.C. 154(b) by 0 days.

(21) Appl. No.: 18/954,859

(22) Filed: Nov. 21, 2024

(65) Prior Publication Data

US 2025/0161988 A1 May 22, 2025

Related U.S. Application Data

(60) Provisional application No. 63/601,421, filed on Nov. 21, 2023.

(51) Int. Cl.
*B07B 1/12* (2006.01)

(52) U.S. Cl.
CPC .................................... *B07B 1/12* (2013.01)

(58) Field of Classification Search
CPC ................................ B07B 1/12; B07B 1/4609
USPC .................................................. 209/393, 395
See application file for complete search history.

(56) References Cited

U.S. PATENT DOCUMENTS 425,797 A 4/1890 Hunt
469,868 A 3/1892 Osbourn
705,926 A 7/1902 Hemingway
760,372 A 5/1904 Beam
845,719 A 2/1907 Schniewind
875,989 A 1/1908 Garner
976,580 A 11/1910 Krause
(Continued)

FOREIGN PATENT DOCUMENTS

CA 1172895 8/1984
CA 2775992 5/2011
(Continued)

OTHER PUBLICATIONS

Gkotsis, et al., "Membrane-Based Technologies for Post-Combustion CO2 Capture from Flue Gases: Recent Progress in Commonly Employed Membrane Materials," Membranes 2023, 13, 898; 27 pages.

(Continued)

*Primary Examiner* — Joseph C Rodriguez
(74) *Attorney, Agent, or Firm* — Perkins Coie LLP; Vijay S. Kumar

(57) ABSTRACT

Systems, devices and methods for screening materials or industrial products, such as foundry coke, are disclosed herein. In some embodiments, representative systems and/or devices can include (i) a plurality of screening members each extending along a first axis, wherein the screening members are configured to make contact with a material to be screened, (ii) a plurality of elevating members extending along the first axis, wherein individual elevating member are coupled to a lower portion of corresponding individual screening members, and (iii) a cross support extending along a second axis angled relative to the first axis, wherein the cross support is coupled to a lower portion of at least some of the elevating members.

8 Claims, 13 Drawing Sheets

(56) References Cited

U.S. PATENT DOCUMENTS 1,140,798 A 5/1915 Carpenter
1,220,232 A * 3/1917 Jackson .................. B07B 1/469 209/393
1,378,782 A 5/1921 Floyd
1,424,777 A 8/1922 Schondeling
1,429,346 A 9/1922 Horn
1,430,027 A 9/1922 Plantinga
1,486,401 A 3/1924 Ackeren
1,491,802 A * 4/1924 Irwin ...................... B07B 13/00 209/679
1,530,995 A 3/1925 Geiger
1,572,391 A 2/1926 Klaiber
1,676,729 A 7/1928 Erwin
1,677,973 A 7/1928 Marquard
1,705,039 A 3/1929 Thornhill
1,721,813 A 7/1929 Geipert
1,757,682 A 5/1930 Palm
1,818,370 A 8/1931 Wine
1,818,994 A 8/1931 Kreisinger
1,830,951 A 11/1931 Lovett
1,848,818 A 3/1932 Becker
1,895,202 A 1/1933 Montgomery
1,947,499 A 2/1934 Schrader et al.
1,955,962 A 4/1934 Jones
1,979,507 A 11/1934 Underwood
2,075,337 A 3/1937 Burnaugh
2,141,035 A 12/1938 Daniels
2,195,466 A 4/1940 Otto
2,235,970 A 3/1941 Wilputte
2,340,283 A 1/1944 Vladu
2,340,981 A 2/1944 Otto
2,343,034 A 2/1944 Weber
2,394,173 A 2/1946 Harris et al.
2,424,012 A 7/1947 Bangham et al.
2,486,199 A 10/1949 Nier
2,609,948 A 9/1952 Laveley
2,641,575 A 6/1953 Otto
2,649,978 A 8/1953 Smith
2,667,185 A 1/1954 Beavers
2,723,725 A 11/1955 Keiffer
2,756,842 A 7/1956 Chamberlin et al.
2,765,266 A 10/1956 Throop et al.
2,813,708 A 11/1957 Frey
2,827,424 A 3/1958 Homan
2,873,816 A 2/1959 Emil et al.
2,902,991 A 9/1959 Whitman
2,907,698 A 10/1959 Schulz
2,968,083 A 1/1961 Lentz et al.
3,010,882 A 11/1961 Barclay et al.
3,015,893 A 1/1962 McCreary
3,026,715 A 3/1962 Briggs
3,033,764 A 5/1962 Hannes
3,085,582 A 4/1963 Slosman
3,134,733 A * 5/1964 Rose ......................... B07B 1/12 209/393
3,175,961 A 3/1965 Samson
3,199,135 A 8/1965 Trucker
3,224,805 A 12/1965 Clyatt
3,259,551 A 7/1966 Thompson, Jr.
3,265,044 A 8/1966 Juchtern
3,267,913 A 8/1966 Jakob
3,327,521 A 6/1967 Briggs
3,342,990 A 9/1967 Barrington et al.
3,381,355 A * 5/1968 Bixby ................... B07B 1/4609 29/897.15
3,444,046 A 5/1969 Harlow
3,444,047 A 5/1969 Wilde
3,448,012 A 6/1969 Allred
3,453,839 A 7/1969 Sabin
3,462,345 A 8/1969 Kernan
3,462,346 A 8/1969 Kernan et al.
3,494,461 A * 2/1970 Fournier ................... B07B 1/46 209/313
3,511,030 A 5/1970 Brown et al.
3,542,650 A 11/1970 Kulakov
3,545,470 A 12/1970 Paton
3,587,198 A 6/1971 Hensel
3,591,827 A 7/1971 Hall
3,592,742 A 7/1971 Thompson
3,616,408 A 10/1971 Hickam
3,623,511 A 11/1971 Levin
3,630,852 A 12/1971 Nashan et al.
3,652,403 A 3/1972 Knappstein et al.
3,676,305 A 7/1972 Cremer
3,709,794 A 1/1973 Kinzler et al.
3,710,551 A 1/1973 Sved
3,746,626 A 7/1973 Morrison, Jr.
3,748,235 A 7/1973 Pries
3,784,034 A 1/1974 Thompson
3,788,236 A 1/1974 Edgar et al.
3,806,032 A 4/1974 Pries
3,811,572 A 5/1974 Tatterson
3,836,161 A 9/1974 Buhl
3,839,156 A 10/1974 Jakobi et al.
3,844,900 A 10/1974 Schulte
3,848,744 A * 11/1974 Flaherty .................... B07B 1/12 209/406
3,857,758 A 12/1974 Mole
3,868,309 A 2/1975 Sustarsic et al.
3,875,016 A 4/1975 Schmidt-Balve
3,876,143 A 4/1975 Rossow et al.
3,876,506 A 4/1975 Dix et al.
3,878,053 A 4/1975 Hyde
3,894,302 A 7/1975 Lasater
3,897,312 A 7/1975 Armour et al.
3,897,313 A 7/1975 Ibaragi et al.
3,901,801 A * 8/1975 Bixby ..................... E04C 2/423 209/352
3,906,992 A 9/1975 Leach
3,912,091 A 10/1975 Thompson
3,912,597 A 10/1975 MacDonald
3,917,458 A 11/1975 Polak
3,928,144 A 12/1975 Jakimowicz
3,930,961 A 1/1976 Sustarsic et al.
3,933,443 A 1/1976 Lohrmann
3,957,591 A 5/1976 Riecker
3,959,084 A 5/1976 Price
3,963,582 A 6/1976 Helm et al.
3,969,191 A 7/1976 Bollenbach
3,975,148 A 8/1976 Fukuda et al.
3,979,870 A 9/1976 Moore
3,984,289 A 10/1976 Sustarsic et al.
3,990,948 A 11/1976 Lindgren
4,004,702 A 1/1977 Szendroi
4,004,983 A 1/1977 Pries
4,010,695 A 3/1977 Mantione
4,019,963 A 4/1977 Hanley, Jr.
4,025,395 A 5/1977 Ekholm et al.
4,040,910 A 8/1977 Knappstein et al.
4,045,056 A 8/1977 Kandakov et al.
4,045,299 A 8/1977 McDonald
4,059,885 A 11/1977 Oldengott
4,065,059 A 12/1977 Jablin
4,067,462 A 1/1978 Thompson
4,077,848 A 3/1978 Grainer et al.
4,083,753 A 4/1978 Rogers et al.
4,086,231 A 4/1978 Ikio
4,093,245 A 6/1978 Connor
4,100,033 A 7/1978 Holter
4,100,491 A 7/1978 Newman, Jr. et al.
4,100,889 A 7/1978 Chayes
4,111,757 A 9/1978 Carimboli
4,120,790 A * 10/1978 Tinker ................... B01D 35/28 209/267
4,124,450 A 11/1978 MacDonald
4,131,070 A 12/1978 Jonnet
4,133,720 A 1/1979 Franzer et al.
4,135,948 A 1/1979 Mertens et al.
4,135,986 A 1/1979 Cain et al.
4,141,299 A 2/1979 Friend et al.
4,141,796 A 2/1979 Clark et al.
4,143,104 A 3/1979 van Konijnenburg et al.
4,145,195 A 3/1979 Knappstein et al.

(56) References Cited

U.S. PATENT DOCUMENTS 4,147,230 A 4/1979 Ormond et al.
4,162,546 A 7/1979 Shortell et al.
4,176,013 A 11/1979 Garthus et al.
4,181,459 A 1/1980 Price
4,189,272 A 2/1980 Gregor et al.
4,194,951 A 3/1980 Pries
4,196,053 A 4/1980 Grohmann
4,196,054 A 4/1980 Becker, Jr. et al.
4,211,608 A 7/1980 Kwasnoski et al.
4,211,611 A 7/1980 Bocsanczy
4,213,489 A 7/1980 Cain
4,213,827 A 7/1980 Calderon
4,213,828 A 7/1980 Calderon
4,222,748 A 9/1980 Argo et al.
4,222,824 A 9/1980 Flockenhaus et al.
4,224,109 A 9/1980 Flockenhaus et al.
4,225,393 A 9/1980 Gregor et al.
4,226,113 A 10/1980 Pelletier et al.
4,230,498 A 10/1980 Ruecki
4,235,830 A 11/1980 Bennett et al.
4,236,998 A * 12/1980 Heys ...................... D21B 1/325 209/250
4,239,602 A 12/1980 La Bate
4,248,671 A 2/1981 Belding
4,249,997 A 2/1981 Schmitz
4,263,099 A 4/1981 Porter
4,268,360 A 5/1981 Tsuzuki et al.
4,271,814 A 6/1981 Lister
4,284,478 A 8/1981 Brommel
4,285,772 A 8/1981 Kress
4,287,024 A 9/1981 Thompson
4,289,479 A 9/1981 Johnson
4,289,584 A 9/1981 Chuss et al.
4,289,585 A 9/1981 Wagener et al.
4,296,938 A 10/1981 Offermann et al.
4,298,497 A 11/1981 Colombo
4,299,666 A 11/1981 Ostmann
4,302,935 A 12/1981 Cousimano
4,303,615 A 12/1981 Jarmell et al.
4,307,673 A 12/1981 Caughey
4,312,711 A 1/1982 Brown et al.
4,312,712 A 1/1982 Kwasnik et al.
4,314,787 A 2/1982 Kwasnik et al.
4,316,435 A 2/1982 Nagamatsu et al.
4,324,568 A 4/1982 Wilcox et al.
4,330,372 A 5/1982 Cairns et al.
4,334,963 A 6/1982 Stog
4,336,107 A 6/1982 Irwin
4,336,843 A 6/1982 Petty
4,340,445 A 7/1982 Kucher et al.
4,342,195 A 8/1982 Lo
4,344,820 A 8/1982 Thompson
4,344,822 A 8/1982 Schwartz et al.
4,353,189 A 10/1982 Thiersch et al.
4,366,029 A 12/1982 Bixby et al.
4,373,244 A 2/1983 Mertens et al.
4,375,388 A 3/1983 Hara et al.
4,385,962 A 5/1983 Stewen et al.
4,391,674 A 7/1983 Velmin et al.
4,392,824 A 7/1983 Struck et al.
4,394,217 A 7/1983 Holz et al.
4,395,269 A 7/1983 Schuler
4,396,394 A 8/1983 Li et al.
4,396,461 A 8/1983 Neubaum et al.
4,406,619 A 9/1983 Oldengott
4,407,237 A 10/1983 Merritt
4,421,070 A 12/1983 Sullivan
4,431,484 A 2/1984 Weber et al.
4,439,277 A 3/1984 Dix
4,440,098 A 4/1984 Adams
4,441,892 A 4/1984 Schuster
4,445,977 A 5/1984 Husher
4,446,018 A 5/1984 Cerwick
4,448,541 A 5/1984 Lucas
4,452,749 A 6/1984 Kolvek et al.
4,459,103 A 7/1984 Gieskieng
4,469,446 A 9/1984 Goodboy
4,474,344 A 10/1984 Bennett
4,487,137 A 12/1984 Horvat et al.
4,498,786 A 2/1985 Ruscheweyh
4,506,025 A 3/1985 Kleeb et al.
4,508,539 A 4/1985 Nakai
4,518,461 A 5/1985 Gelfand
4,527,488 A 7/1985 Lindgren
4,529,407 A 7/1985 Johnston et al.
4,564,420 A 1/1986 Spindeler et al.
4,568,424 A 2/1986 Bauer
4,568,426 A 2/1986 Orlando
4,570,670 A 2/1986 Johnson
4,614,567 A 9/1986 Stahlherm et al.
4,643,327 A 2/1987 Campbell
4,645,513 A 2/1987 Kubota et al.
4,655,193 A 4/1987 Blacket
4,655,804 A 4/1987 Kercheval et al.
4,666,675 A 5/1987 Parker et al.
4,680,167 A 7/1987 Orlando
4,681,662 A 7/1987 Kutsumura et al.
4,690,689 A 9/1987 Malcosky et al.
4,704,195 A 11/1987 Janicka et al.
4,720,262 A 1/1988 Durr et al.
4,724,976 A 2/1988 Lee
4,726,465 A 2/1988 Kwasnik et al.
4,732,652 A 3/1988 Durselen et al.
4,749,446 A 6/1988 van Laar et al.
4,793,981 A 12/1988 Doyle et al.
4,821,473 A 4/1989 Cowell
4,822,388 A 4/1989 Gee
4,824,614 A 4/1989 Jones et al.
4,889,698 A 12/1989 Moller et al.
4,898,021 A 2/1990 Weaver et al.
4,918,975 A 4/1990 Voss
4,919,170 A 4/1990 Kallinich et al.
4,929,179 A 5/1990 Breidenbach et al.
4,941,824 A 7/1990 Holter et al.
4,981,496 A 1/1991 Hausslein
5,013,408 A 5/1991 Asai et al.
5,052,922 A 10/1991 Stokman et al.
5,062,925 A 11/1991 Durselen et al.
5,078,822 A 1/1992 Hodges et al.
5,087,328 A 2/1992 Wegerer et al.
5,114,542 A 5/1992 Childress et al.
5,213,138 A 5/1993 Presz
5,227,106 A 7/1993 Kolvek
5,228,955 A 7/1993 Westbrook, III
5,234,601 A 8/1993 Janke et al.
5,318,671 A 6/1994 Pruitt
5,370,218 A 12/1994 Johnson et al.
5,394,600 A * 3/1995 Chen ......................... B07B 1/18 29/773
5,398,543 A 3/1995 Fukushima et al.
5,423,152 A 6/1995 Kolvek
5,447,606 A 9/1995 Pruitt
5,480,594 A 1/1996 Wilkerson et al.
5,514,849 A 5/1996 Findlan et al.
5,542,650 A 8/1996 Abel et al.
5,597,452 A 1/1997 Hippe et al.
5,603,810 A 2/1997 Michler
5,622,280 A 4/1997 Mays et al.
5,659,110 A 8/1997 Herden et al.
5,670,025 A 9/1997 Baird
5,687,768 A 11/1997 Albrecht et al.
5,705,037 A 1/1998 Reinke et al.
5,715,962 A 2/1998 McDonnell
5,720,855 A 2/1998 Baird
5,745,969 A 5/1998 Yamada et al.
5,752,548 A 5/1998 Matsumoto et al.
5,752,993 A 5/1998 Eatough et al.
5,787,821 A 8/1998 Bhat et al.
5,810,032 A 9/1998 Hong et al.
5,816,210 A 10/1998 Yamaguchi
5,857,308 A 1/1999 Dismore et al.
5,881,551 A 3/1999 Dang
5,913,448 A 6/1999 Mann et al.
5,928,476 A 7/1999 Daniels

(56) References Cited

U.S. PATENT DOCUMENTS 5,966,886 A 10/1999 Di Loreto
5,968,320 A 10/1999 Sprague
6,002,993 A 12/1999 Naito et al.
6,003,706 A 12/1999 Rosen
6,017,214 A 1/2000 Sturgulewski
6,022,112 A 2/2000 Isler et al.
6,059,932 A 5/2000 Sturgulewski
6,126,910 A 10/2000 Wilhelm et al.
6,139,692 A 10/2000 Tamura et al.
6,152,668 A 11/2000 Knoch
6,156,688 A 12/2000 Ando et al.
6,173,679 B1 1/2001 Bruckner et al.
6,187,148 B1 2/2001 Sturgulewski
6,189,819 B1 2/2001 Racine
6,247,231 B1 6/2001 Findlan et al.
6,290,494 B1 9/2001 Barkdoll
6,412,221 B1 7/2002 Emsbo
6,424,457 B1 7/2002 Koonmen et al.
6,495,268 B1 12/2002 Harth et al.
6,539,602 B1 4/2003 Ozawa et al.
6,596,128 B2 7/2003 Westbrook
6,626,984 B1 9/2003 Taylor
6,699,035 B2 3/2004 Brooker
6,712,576 B2 3/2004 Skarzenski et al.
6,758,875 B2 7/2004 Reid et al.
6,786,941 B2 9/2004 Reeves et al.
6,830,660 B1 12/2004 Yamauchi et al.
6,907,895 B2 6/2005 Johnson et al.
6,946,011 B2 9/2005 Snyder
6,964,236 B2 11/2005 Schucker
7,056,390 B2 6/2006 Fratello
7,077,892 B2 7/2006 Lee
7,314,060 B2 1/2008 Chen et al.
7,331,298 B2 2/2008 Barkdoll et al.
7,433,743 B2 10/2008 Pistikopoulos et al.
7,497,930 B2 3/2009 Barkdoll et al.
7,547,377 B2 6/2009 Inamasu et al.
7,611,609 B1 11/2009 Valia et al.
7,644,711 B2 1/2010 Creel
7,722,843 B1 5/2010 Srinivasachar
7,727,307 B2 6/2010 Winkler
7,785,447 B2 8/2010 Eatough et al.
7,803,627 B2 9/2010 Hodges et al.
7,823,401 B2 11/2010 Takeuchi et al.
7,827,689 B2 11/2010 Crane
7,998,316 B2 8/2011 Barkdoll
8,071,060 B2 12/2011 Ukai et al.
8,079,751 B2 12/2011 Kapila et al.
8,080,088 B1 12/2011 Srinivasachar
8,146,376 B1 4/2012 Williams et al.
8,152,970 B2 4/2012 Barkdoll et al.
8,172,930 B2 5/2012 Barkdoll
8,236,142 B2 8/2012 Westbrook
8,266,853 B2 9/2012 Bloom et al.
8,311,777 B2 11/2012 Suguira et al.
8,383,055 B2 2/2013 Palmer
8,398,935 B2 3/2013 Howell et al.
8,409,405 B2 4/2013 Kim et al.
8,500,881 B2 8/2013 Orita et al.
8,515,508 B2 8/2013 Kawamura et al.
8,568,568 B2 10/2013 Schuecker et al.
8,640,635 B2 2/2014 Bloom et al.
8,647,476 B2 2/2014 Kim et al.
8,800,795 B2 8/2014 Hwang
8,956,995 B2 2/2015 Masatsugu et al.
8,980,063 B2 3/2015 Kim et al.
9,039,869 B2 5/2015 Kim et al.
9,057,023 B2 6/2015 Reichelt et al.
9,103,234 B2 8/2015 Gu et al.
9,169,439 B2 10/2015 Sarpen et al.
9,193,913 B2 11/2015 Quanci et al.
9,193,915 B2 11/2015 West et al.
9,200,225 B2 12/2015 Barkdoll et al.
9,238,778 B2 1/2016 Quanci et al.
9,243,186 B2 1/2016 Quanci et al.
9,249,357 B2 2/2016 Quanci et al.
9,273,249 B2 3/2016 Quanci et al.
9,273,250 B2 3/2016 Choi et al.
9,321,965 B2 4/2016 Barkdoll
9,359,554 B2 6/2016 Quanci et al.
9,404,043 B2 8/2016 Kim
9,463,980 B2 10/2016 Fukada et al.
9,476,547 B2 10/2016 Quanci et al.
9,498,786 B2 11/2016 Pearson
9,580,656 B2 2/2017 Quanci et al.
9,672,499 B2 6/2017 Quanci et al.
9,683,740 B2 6/2017 Rodgers et al.
9,708,542 B2 7/2017 Quanci et al.
9,862,888 B2 1/2018 Quanci et al.
9,976,089 B2 5/2018 Quanci et al.
10,016,714 B2 7/2018 Quanci et al.
10,041,002 B2 8/2018 Quanci et al.
10,047,295 B2 8/2018 Chun et al.
10,047,296 B2 8/2018 Chun et al.
10,053,627 B2 8/2018 Sarpen et al.
10,087,579 B2 * 10/2018 Ottosson .................. D21C 7/08
10,233,392 B2 3/2019 Quanci et al.
10,308,876 B2 6/2019 Quanci et al.
10,323,192 B2 6/2019 Quanci et al.
10,392,563 B2 8/2019 Kim et al.
10,435,042 B1 10/2019 Weymouth
10,526,541 B2 1/2020 West et al.
10,526,542 B2 1/2020 Quanci et al.
10,578,521 B1 3/2020 Dinakaran et al.
10,611,965 B2 4/2020 Quanci et al.
10,619,101 B2 4/2020 Quanci et al.
10,732,621 B2 8/2020 Cella et al.
10,760,002 B2 9/2020 Ball et al.
10,851,306 B2 12/2020 Crum et al.
10,877,007 B2 12/2020 Steele et al.
10,883,051 B2 1/2021 Quanci et al.
10,920,148 B2 2/2021 Quanci et al.
10,927,303 B2 2/2021 Choi et al.
10,947,455 B2 3/2021 Quanci et al.
10,968,393 B2 4/2021 West et al.
10,968,395 B2 4/2021 Quanci et al.
10,975,309 B2 4/2021 Quanci et al.
10,975,310 B2 4/2021 Quanci et al.
10,975,311 B2 4/2021 Quanci et al.
11,008,517 B2 5/2021 Chun et al.
11,008,518 B2 5/2021 Quanci
11,021,655 B2 6/2021 Quanci
11,053,444 B2 7/2021 Quanci et al.
11,060,032 B2 7/2021 Quanci et al.
11,071,935 B2 7/2021 Quanci
11,098,252 B2 8/2021 Quanci
11,117,087 B2 9/2021 Quanci
11,142,699 B2 10/2021 West et al.
11,186,778 B2 11/2021 Crum et al.
11,193,069 B2 12/2021 Quanci
11,214,739 B2 1/2022 Quanci et al.
11,261,381 B2 3/2022 Quanci
11,359,145 B2 6/2022 Ball et al.
11,359,146 B2 6/2022 Quanci et al.
11,365,355 B2 6/2022 Quanci
11,395,989 B2 7/2022 Quanci
11,441,077 B2 9/2022 Quanci et al.
11,441,078 B2 9/2022 Quanci et al.
11,486,572 B2 11/2022 Quanci
11,505,747 B2 11/2022 Quanci et al.
11,508,230 B2 11/2022 Quanci et al.
11,597,881 B2 3/2023 Quanci et al.
11,643,602 B2 5/2023 Quanci et al.
11,680,208 B2 6/2023 Quanci et al.
11,692,138 B2 7/2023 Quanci et al.
11,746,296 B2 9/2023 Choi et al.
11,760,937 B2 9/2023 Quanci
11,767,482 B2 9/2023 Quanci et al.
11,788,012 B2 10/2023 Quanci et al.
11,795,400 B2 10/2023 West et al.
11,807,812 B2 11/2023 Quanci et al.
11,819,802 B2 11/2023 Quanci et al.
11,845,037 B2 12/2023 Quanci et al.
11,851,724 B2 12/2023 Quanci et al.

(56) References Cited

U.S. PATENT DOCUMENTS

| | | | |
|---|---|---|---|
| 11,939,526 | B2 | 3/2024 | West et al. |
| 11,946,108 | B2 | 4/2024 | Quanci et al. |
| 12,060,525 | B2 | 8/2024 | Quanci et al. |
| 12,110,458 | B2 | 10/2024 | Quanci et al. |
| 12,195,671 | B2 | 1/2025 | Quanci et al. |
| 12,215,289 | B2 | 2/2025 | Quanci et al. |
| 12,227,699 | B2 | 2/2025 | Quanci et al. |
| 2002/0170605 | A1 | 11/2002 | Shiraishi et al. |
| 2003/0014954 | A1 | 1/2003 | Ronning et al. |
| 2003/0015809 | A1 | 1/2003 | Carson |
| 2003/0057083 | A1 | 3/2003 | Eatough et al. |
| 2004/0016377 | A1 | 1/2004 | Johnson et al. |
| 2004/0220840 | A1 | 11/2004 | Bonissone et al. |
| 2005/0087767 | A1 | 4/2005 | Fitzgerald et al. |
| 2005/0096759 | A1 | 5/2005 | Benjamin et al. |
| 2006/0029532 | A1 | 2/2006 | Breen et al. |
| 2006/0102420 | A1 | 5/2006 | Huber et al. |
| 2006/0149407 | A1 | 7/2006 | Markham et al. |
| 2007/0087946 | A1 | 4/2007 | Quest et al. |
| 2007/0102278 | A1 | 5/2007 | Inamasu et al. |
| 2007/0116619 | A1 | 5/2007 | Taylor et al. |
| 2007/0181717 | A1 | 8/2007 | Fuller |
| 2007/0251198 | A1 | 11/2007 | Witter |
| 2008/0028935 | A1 | 2/2008 | Andersson |
| 2008/0116052 | A1 | 5/2008 | Eatough et al. |
| 2008/0179165 | A1 | 7/2008 | Chen et al. |
| 2008/0250863 | A1 | 10/2008 | Moore |
| 2008/0257236 | A1 | 10/2008 | Green |
| 2008/0271985 | A1 | 11/2008 | Yamasaki |
| 2008/0289305 | A1 | 11/2008 | Girondi |
| 2009/0007785 | A1 | 1/2009 | Kimura et al. |
| 2009/0032385 | A1 | 2/2009 | Engle |
| 2009/0105852 | A1 | 4/2009 | Wintrich et al. |
| 2009/0152092 | A1 | 6/2009 | Kim et al. |
| 2009/0162269 | A1 | 6/2009 | Barger et al. |
| 2009/0217576 | A1 | 9/2009 | Kim et al. |
| 2009/0257932 | A1 | 10/2009 | Canari et al. |
| 2009/0283395 | A1 | 11/2009 | Hippe |
| 2010/0015564 | A1 | 1/2010 | Chun et al. |
| 2010/0095521 | A1 | 4/2010 | Kartal et al. |
| 2010/0106310 | A1 | 4/2010 | Grohman |
| 2010/0113266 | A1 | 5/2010 | Abe et al. |
| 2010/0115912 | A1 | 5/2010 | Worley |
| 2010/0119425 | A1 | 5/2010 | Palmer |
| 2010/0159247 | A1 | 6/2010 | Kaya et al. |
| 2010/0181297 | A1 | 7/2010 | Whysail |
| 2010/0196597 | A1 | 8/2010 | Di Loreto |
| 2010/0276269 | A1 | 11/2010 | Schuecker et al. |
| 2010/0287871 | A1 | 11/2010 | Bloom et al. |
| 2010/0300867 | A1 | 12/2010 | Kim et al. |
| 2010/0314234 | A1 | 12/2010 | Knoch et al. |
| 2011/0000284 | A1 | 1/2011 | Kumar et al. |
| 2011/0014406 | A1 | 1/2011 | Coleman et al. |
| 2011/0048917 | A1 | 3/2011 | Kim et al. |
| 2011/0083314 | A1 | 4/2011 | Baird |
| 2011/0088600 | A1 | 4/2011 | McRae |
| 2011/0100273 | A1 | 5/2011 | Ptacek |
| 2011/0120852 | A1 | 5/2011 | Kim |
| 2011/0144406 | A1 | 6/2011 | Masatsugu et al. |
| 2011/0156902 | A1 | 6/2011 | Wang et al. |
| 2011/0162265 | A1 | 7/2011 | Krumpp et al. |
| 2011/0168482 | A1 | 7/2011 | Merchant et al. |
| 2011/0174301 | A1 | 7/2011 | Haydock et al. |
| 2011/0192395 | A1 | 8/2011 | Kim |
| 2011/0198206 | A1 | 8/2011 | Kim et al. |
| 2011/0223088 | A1 | 9/2011 | Chang et al. |
| 2011/0253521 | A1 | 10/2011 | Kim |
| 2011/0272508 | A1 | 11/2011 | Krebs et al. |
| 2011/0291827 | A1 | 12/2011 | Baldocchi et al. |
| 2011/0313218 | A1 | 12/2011 | Dana |
| 2011/0315538 | A1 | 12/2011 | Kim et al. |
| 2012/0031076 | A1 | 2/2012 | Frank et al. |
| 2012/0125709 | A1 | 5/2012 | Merchant et al. |
| 2012/0152720 | A1 | 6/2012 | Reichelt et al. |
| 2012/0177541 | A1 | 7/2012 | Mutsuda et al. |
| 2012/0179421 | A1 | 7/2012 | Dasgupta |
| 2012/0180133 | A1 | 7/2012 | Ai-Harbi et al. |
| 2012/0195815 | A1 | 8/2012 | Moore et al. |
| 2012/0210635 | A1 | 8/2012 | Edwards |
| 2012/0228115 | A1 | 9/2012 | Westbrook |
| 2012/0247939 | A1 | 10/2012 | Kim et al. |
| 2012/0285080 | A1 | 11/2012 | Despen et al. |
| 2012/0305380 | A1 | 12/2012 | Wang et al. |
| 2012/0312019 | A1 | 12/2012 | Rechtman |
| 2013/0020781 | A1 | 1/2013 | Kishikawa |
| 2013/0045149 | A1 | 2/2013 | Miller |
| 2013/0213114 | A1 | 8/2013 | Wetzig et al. |
| 2013/0216717 | A1 | 8/2013 | Rago et al. |
| 2013/0220373 | A1 | 8/2013 | Kim |
| 2013/0306462 | A1 | 11/2013 | Kim et al. |
| 2014/0039833 | A1 | 2/2014 | Sharpe, Jr. et al. |
| 2014/0156584 | A1 | 6/2014 | Motukuri et al. |
| 2014/0208997 | A1 | 7/2014 | Alferyev et al. |
| 2014/0224123 | A1 | 8/2014 | Walters |
| 2014/0245803 | A1 | 9/2014 | Forsythe et al. |
| 2014/0308620 | A1 | 10/2014 | Deng et al. |
| 2015/0041304 | A1 | 2/2015 | Kiim et al. |
| 2015/0075962 | A1 | 3/2015 | Shimoyama et al. |
| 2015/0122629 | A1 | 5/2015 | Freimuth et al. |
| 2015/0143908 | A1 | 5/2015 | Cetinkaya |
| 2015/0175433 | A1 | 6/2015 | Micka et al. |
| 2015/0176095 | A1 | 6/2015 | Connors et al. |
| 2015/0219530 | A1 | 8/2015 | Li et al. |
| 2015/0226499 | A1 | 8/2015 | Mikkelsen |
| 2016/0026193 | A1 | 1/2016 | Rhodes et al. |
| 2016/0048139 | A1 | 2/2016 | Samples et al. |
| 2016/0149944 | A1 | 5/2016 | Obermeirer et al. |
| 2016/0154171 | A1 | 6/2016 | Kato et al. |
| 2016/0370082 | A1 | 12/2016 | Olivo |
| 2016/0377430 | A1 | 12/2016 | Kalagnanam et al. |
| 2017/0173519 | A1 | 6/2017 | Naito |
| 2017/0182447 | A1 | 6/2017 | Sappok et al. |
| 2017/0218274 | A1 | 8/2017 | Yu et al. |
| 2017/0226425 | A1 | 8/2017 | Kim et al. |
| 2017/0261417 | A1 | 9/2017 | Zhang |
| 2017/0313943 | A1 | 11/2017 | Valdevies |
| 2019/0317167 | A1 | 10/2019 | LaBorde et al. |
| 2020/0071190 | A1 | 3/2020 | Wiederin et al. |
| 2020/0139273 | A1 | 5/2020 | Badiei |
| 2020/0173679 | A1 | 6/2020 | O'Reilly et al. |
| 2020/0208063 | A1 | 7/2020 | Quanci |
| 2021/0261877 | A1 | 8/2021 | Despen et al. |
| 2021/0363427 | A1 | 11/2021 | Quanci et al. |
| 2022/0056342 | A1 | 2/2022 | Quanci et al. |
| 2022/0356410 | A1 | 11/2022 | Quanci et al. |
| 2023/0258326 | A1 | 8/2023 | Quanci et al. |
| 2023/0330596 | A1 | 10/2023 | Bumb et al. |
| 2023/0360511 | A1 | 11/2023 | Quanci et al. |
| 2023/0416629 | A1 | 12/2023 | Quanci et al. |
| 2024/0059994 | A1 | 2/2024 | Quanci et al. |
| 2024/0110103 | A1 | 4/2024 | Quanci et al. |
| 2024/0150659 | A1 | 5/2024 | Quanci et al. |
| 2024/0158709 | A1 | 5/2024 | Quanci et al. |
| 2024/0158877 | A1 | 5/2024 | Quanci et al. |
| 2024/0209265 | A1 | 6/2024 | Quanci et al. |
| 2024/0229172 | A1 | 7/2024 | Quanci et al. |
| 2024/0229173 | A1 | 7/2024 | Quanci et al. |
| 2025/0027177 | A1 | 1/2025 | Quanci et al. |
| 2025/0163328 | A1 | 5/2025 | Choi et al. |
| 2025/0163329 | A1 | 5/2025 | Choi et al. |
| 2025/0163339 | A1 | 5/2025 | Quanci et al. |
| 2025/0187018 | A1 | 6/2025 | Quanci et al. |
| 2025/0188353 | A1 | 6/2025 | Quanci et al. |
| 2025/0250489 | A1 | 8/2025 | Quanci et al. |

FOREIGN PATENT DOCUMENTS

| | | | |
|---|---|---|---|
| CA | 2822841 | | 7/2012 |
| CA | 2822857 | | 7/2012 |
| CA | 2905110 | A1 | 9/2014 |
| CN | 87212113 | U | 6/1988 |
| CN | 87107195 | A | 7/1988 |
| CN | 2064363 | U | 10/1990 |
| CN | 2139121 | Y | 7/1993 |

(56) References Cited

FOREIGN PATENT DOCUMENTS

| | | | |
|---|---|---|---|
| CN | 1092457 | A | 9/1994 |
| CN | 1255528 | A | 6/2000 |
| CN | 1270983 | A | 10/2000 |
| CN | 2528771 | Y | 2/2002 |
| CN | 1358822 | A | 7/2002 |
| CN | 2521473 | Y | 11/2002 |
| CN | 1425742 | A | 6/2003 |
| CN | 1468364 | A | 1/2004 |
| CN | 1527872 | A | 9/2004 |
| CN | 2668641 | | 1/2005 |
| CN | 1957204 | A | 5/2007 |
| CN | 101037603 | A | 9/2007 |
| CN | 101058731 | A | 10/2007 |
| CN | 101157874 | A | 4/2008 |
| CN | 101211495 | A | 7/2008 |
| CN | 201121178 | Y | 9/2008 |
| CN | 101362971 | A | 2/2009 |
| CN | 101395248 | A | 3/2009 |
| CN | 100510004 | C | 7/2009 |
| CN | 101486017 | A | 7/2009 |
| CN | 201264981 | Y | 7/2009 |
| CN | 101497835 | A | 8/2009 |
| CN | 101509427 | A | 8/2009 |
| CN | 101886466 | A | 11/2010 |
| CN | 101910530 | A | 12/2010 |
| CN | 101921643 | A | 12/2010 |
| CN | 102072829 | A | 5/2011 |
| CN | 102155300 | A | 8/2011 |
| CN | 2509188 | Y | 11/2011 |
| CN | 202226816 | | 5/2012 |
| CN | 202265541 | U | 6/2012 |
| CN | 102584294 | A | 7/2012 |
| CN | 202415446 | U | 9/2012 |
| CN | 202470353 | U | 10/2012 |
| CN | 103399536 | A | 11/2013 |
| CN | 103468289 | A | 12/2013 |
| CN | 103468841 | A | 12/2013 |
| CN | 103756699 | A | 4/2014 |
| CN | 103913193 | A | 7/2014 |
| CN | 203981700 | U | 12/2014 |
| CN | 104498059 | A | 4/2015 |
| CN | 104877690 | A | 9/2015 |
| CN | 104915746 | A | 9/2015 |
| CN | 105001914 | A | 10/2015 |
| CN | 105137947 | A | 12/2015 |
| CN | 105189704 | A | 12/2015 |
| CN | 105264448 | A | 1/2016 |
| CN | 105467949 | A | 4/2016 |
| CN | 105710028 | A | 6/2016 |
| CN | 105842065 | A | 8/2016 |
| CN | 106399607 | A | 2/2017 |
| CN | 106661456 | A | 5/2017 |
| CN | 106687564 | A | 5/2017 |
| CN | 107022359 | A | 8/2017 |
| CN | 107267183 | A | 10/2017 |
| CN | 107445633 | A | 12/2017 |
| CN | 108219807 | A | 6/2018 |
| CN | 105733624 | B | 2/2019 |
| CN | 110141947 | A | 8/2019 |
| CN | 100500619 | C | 6/2020 |
| CN | 111621313 | A | 9/2020 |
| CN | 111621314 | A | 9/2020 |
| CN | 111778048 | A | 10/2020 |
| CN | 113088310 | A | 7/2021 |
| CN | 113322085 | A | 8/2021 |
| CN | 113462415 | A | 10/2021 |
| CN | 215964738 | U | 3/2022 |
| CN | 216126086 | U | 3/2022 |
| CN | 114517099 | A | 5/2022 |
| CN | 101921643 | B | 12/2022 |
| CN | 116606664 | A | 8/2023 |
| CN | 220825067 | U | 4/2024 |
| DE | 201729 | C | 9/1908 |
| DE | 212176 | | 7/1909 |
| DE | 912453 | C | 5/1954 |
| DE | 1103949 | B | 6/1961 |
| DE | 1212037 | B | 3/1966 |
| DE | 2212544 | A | 1/1973 |
| DE | 2720688 | A1 | 11/1978 |
| DE | 3231697 | C1 | 1/1984 |
| DE | 3328702 | A1 | 2/1984 |
| DE | 3315738 | C2 | 3/1984 |
| DE | 3329367 | C | 11/1984 |
| DE | 3407487 | C1 | 6/1985 |
| DE | 19545736 | | 6/1997 |
| DE | 19803455 | | 8/1999 |
| DE | 10122531 | A1 | 11/2002 |
| DE | 10154785 | | 5/2003 |
| DE | 102004062936 | A1 | 7/2006 |
| DE | 102005015301 | | 10/2006 |
| DE | 102006004669 | | 8/2007 |
| DE | 102006026521 | | 12/2007 |
| DE | 102009031436 | | 1/2011 |
| DE | 102011052785 | | 12/2012 |
| DE | 102011121204 | A1 | 6/2013 |
| EA | 010510 | B1 | 10/2008 |
| EP | 0126399 | A1 | 11/1984 |
| EP | 0208490 | A1 | 1/1987 |
| EP | 0418801 | A1 | 3/1991 |
| EP | 0433498 | A1 | 6/1991 |
| EP | 0903393 | A2 | 3/1999 |
| EP | 1538503 | A1 | 6/2005 |
| EP | 1860034 | A1 | 11/2007 |
| EP | 2295129 | A1 | 3/2011 |
| EP | 2468837 | A1 | 6/2012 |
| FR | 2339664 | | 8/1977 |
| FR | 2517802 | | 6/1983 |
| FR | 2764978 | | 12/1998 |
| GB | 364236 | A | 1/1932 |
| GB | 368649 | A | 3/1932 |
| GB | 441784 | | 1/1936 |
| GB | 606340 | | 8/1948 |
| GB | 611524 | | 11/1948 |
| GB | 725865 | | 3/1955 |
| GB | 783720 | A | 9/1957 |
| GB | 871094 | | 6/1961 |
| GB | 923205 | A | 5/1963 |
| GB | 977905 | A | 12/1964 |
| GB | 1148379 | A | 4/1969 |
| GB | 2000193 | A | 1/1979 |
| JP | S50148405 | | 11/1975 |
| JP | S5319301 | A | 2/1978 |
| JP | 54054101 | | 4/1979 |
| JP | S5453103 | A | 4/1979 |
| JP | 57051786 | | 3/1982 |
| JP | 57051787 | | 3/1982 |
| JP | 57083585 | | 5/1982 |
| JP | 57090092 | | 6/1982 |
| JP | S57172978 | A | 10/1982 |
| JP | 58091788 | | 5/1983 |
| JP | 59051978 | | 3/1984 |
| JP | 59053589 | | 3/1984 |
| JP | 59071388 | | 4/1984 |
| JP | 59108083 | | 6/1984 |
| JP | 59145281 | | 8/1984 |
| JP | 60004588 | | 1/1985 |
| JP | 61106690 | | 5/1986 |
| JP | 62011794 | | 1/1987 |
| JP | 62285980 | | 12/1987 |
| JP | 01103694 | | 4/1989 |
| JP | 01249886 | | 10/1989 |
| JP | H0319127 | | 3/1991 |
| JP | 03197588 | | 8/1991 |
| JP | 04159392 | | 6/1992 |
| JP | H04178494 | A | 6/1992 |
| JP | H05230466 | A | 9/1993 |
| JP | H0649450 | A | 2/1994 |
| JP | H0654753 | U | 7/1994 |
| JP | H06264062 | | 9/1994 |
| JP | H06299156 | A | 10/1994 |
| JP | H0776713 | A | 3/1995 |
| JP | 07188668 | | 7/1995 |
| JP | 07216357 | | 8/1995 |
| JP | H07204432 | | 8/1995 |

(56) References Cited

FOREIGN PATENT DOCUMENTS

| | | | |
|---|---|---|---|
| JP | H07252480 | A | 10/1995 |
| JP | H0843314 | A | 2/1996 |
| JP | H08104875 | A | 4/1996 |
| JP | 08127778 | | 5/1996 |
| JP | H08218071 | A | 8/1996 |
| JP | H09310074 | A | 12/1997 |
| JP | H10273672 | A | 10/1998 |
| JP | H11131074 | | 5/1999 |
| JP | H11256166 | A | 9/1999 |
| JP | 2000204373 | A | 7/2000 |
| JP | 2000219883 | A | 8/2000 |
| JP | 2001055576 | A | 2/2001 |
| JP | 2001187887 | A | 7/2001 |
| JP | 2001200258 | | 7/2001 |
| JP | 2002097472 | A | 4/2002 |
| JP | 2002106941 | | 4/2002 |
| JP | 2003041258 | | 2/2003 |
| JP | 2003041618 | A | 2/2003 |
| JP | 2003051082 | A | 2/2003 |
| JP | 2003071313 | A | 3/2003 |
| JP | 2003292968 | A | 10/2003 |
| JP | 2003342581 | A | 12/2003 |
| JP | 2004169016 | A | 6/2004 |
| JP | 2005503448 | A | 2/2005 |
| JP | 2005135422 | A | 5/2005 |
| JP | 2005154597 | A | 6/2005 |
| JP | 2005263983 | A | 9/2005 |
| JP | 2005344085 | A | 12/2005 |
| JP | 2006188608 | A | 7/2006 |
| JP | 2006257252 | A | 9/2006 |
| JP | 2007063420 | A | 3/2007 |
| JP | 3924064 | B2 | 6/2007 |
| JP | 2007169484 | A | 7/2007 |
| JP | 2007231326 | A | 9/2007 |
| JP | 4101226 | B2 | 6/2008 |
| JP | 2008231278 | A | 10/2008 |
| JP | 2009001640 | A | 1/2009 |
| JP | 2009019106 | A | 1/2009 |
| JP | 2009073864 | A | 4/2009 |
| JP | 2009073865 | A | 4/2009 |
| JP | 2009135276 | A | 6/2009 |
| JP | 2009144121 | A | 7/2009 |
| JP | 2009209286 | A | 9/2009 |
| JP | 2010229239 | A | 10/2010 |
| JP | 2010248389 | A | 11/2010 |
| JP | 2011504947 | A | 2/2011 |
| JP | 2011068733 | A | 4/2011 |
| JP | 2011102351 | A | 5/2011 |
| JP | 2012072389 | A | 4/2012 |
| JP | 2012102302 | A | 5/2012 |
| JP | 2012102325 | A | 5/2012 |
| JP | 2013006957 | A | 1/2013 |
| JP | 2013510910 | A | 3/2013 |
| JP | 2013189322 | A | 9/2013 |
| JP | 2014009284 | A | 1/2014 |
| JP | 2014040502 | A | 3/2014 |
| JP | 2015094091 | A | 5/2015 |
| JP | 2015199791 | A | 11/2015 |
| JP | 2016169897 | A | 9/2016 |
| JP | 2020007472 | A | 1/2020 |
| KR | 1019960008754 | | 10/1996 |
| KR | 19990017156 | U | 5/1999 |
| KR | 1019990054426 | | 7/1999 |
| KR | 20000042375 | A | 7/2000 |
| KR | 100296700 | B1 | 10/2001 |
| KR | 20030011016 | A | 2/2003 |
| KR | 20030012458 | A | 2/2003 |
| KR | 1020040020883 | A | 3/2004 |
| KR | 20040107204 | A | 12/2004 |
| KR | 20050053861 | A | 6/2005 |
| KR | 20060132336 | A | 12/2006 |
| KR | 100737393 | B1 | 7/2007 |
| KR | 100797852 | | 1/2008 |
| KR | 20080069170 | A | 7/2008 |
| KR | 20110010452 | A | 2/2011 |
| KR | 101314288 | | 4/2011 |
| KR | 20120033091 | A | 4/2012 |
| KR | 20130050807 | | 5/2013 |
| KR | 101318388 | | 10/2013 |
| KR | 20140042526 | A | 4/2014 |
| KR | 20140076155 | A | 6/2014 |
| KR | 20150011084 | A | 1/2015 |
| KR | 20150068557 | A | 6/2015 |
| KR | 20170038102 | A | 4/2017 |
| KR | 20170058808 | A | 5/2017 |
| KR | 20170103857 | A | 9/2017 |
| KR | 101862491 | B1 | 5/2018 |
| KR | 102116995 | B1 | 6/2020 |
| KR | 20230118420 | A | 8/2023 |
| RU | 2083532 | C1 | 7/1997 |
| RU | 2441898 | C2 | 2/2012 |
| RU | 2493233 | C2 | 9/2013 |
| RU | 2613501 | C1 | 3/2017 |
| SU | 1535880 | A1 | 1/1990 |
| TW | 201241166 | A1 | 10/2012 |
| TW | 201245431 | A1 | 11/2012 |
| UA | 50580 | | 10/2002 |
| WO | WO9012074 | | 10/1990 |
| WO | WO9945083 | | 9/1999 |
| WO | WO02062922 | | 8/2002 |
| WO | WO2003025093 | | 3/2003 |
| WO | WO2005023649 | | 3/2005 |
| WO | WO2005031297 | | 4/2005 |
| WO | WO2005115583 | | 12/2005 |
| WO | WO2006010432 | | 2/2006 |
| WO | WO2007103649 | | 9/2007 |
| WO | WO2008034424 | | 3/2008 |
| WO | WO2008105269 | | 9/2008 |
| WO | WO2009147983 | | 12/2009 |
| WO | WO2010032734 | | 3/2010 |
| WO | WO2010103992 | | 9/2010 |
| WO | WO2010107513 | | 9/2010 |
| WO | WO2011000447 | | 1/2011 |
| WO | WO2011126043 | | 10/2011 |
| WO | 2012037454 | A2 | 3/2012 |
| WO | WO2012029979 | | 3/2012 |
| WO | WO2012031726 | | 3/2012 |
| WO | WO2013023872 | | 2/2013 |
| WO | WO2013145679 | | 10/2013 |
| WO | WO2013153557 | | 10/2013 |
| WO | WO2014021909 | | 2/2014 |
| WO | WO2014043667 | | 3/2014 |
| WO | WO2014105064 | | 7/2014 |
| WO | WO2014153050 | | 9/2014 |
| WO | WO2016004106 | | 1/2016 |
| WO | WO2016033511 | | 3/2016 |
| WO | WO2016033515 | | 3/2016 |
| WO | WO2016086322 | | 6/2016 |
| WO | 2016109699 | A1 | 7/2016 |
| WO | WO2016109854 | | 7/2016 |
| WO | 2016170439 | A1 | 10/2016 |
| WO | 2021225988 | A1 | 11/2021 |
| WO | WO2022159604 | | 7/2022 |
| WO | WO2022235839 | | 11/2022 |
| WO | 2023129090 | A2 | 7/2023 |

OTHER PUBLICATIONS

Mitsubishi Heavy Industries America, Inc., 'Development and demonstration of wasteheat integration with solvent process for more efficient CO2 removal from coal fired flue gas', 2017NETL CO2 Capture Technology Project Review Meeting, Aug. 22, 2017, pp. 1-43.

International Search Report and Written Opinion issued Mar. 14, 2025 for PCT/US2024/056881; 13 pages.

Chiu, et al., "Coke reactivity—Effect of Fe2O3 and K2CO3 addition to the coal charge before carbonization", Fuel, IPC Science and Technology Press, Guildford, GB, vol. 64, No. 7, Jul. 1, 1985 (Jul. 1, 1985), pp. 1007-1010.

Flores, et al., "How coke optical texture became a relevant tool for understanding coal blending and coke quality", Fuel Processing Technology, Elsevier BV, NL, vol. 164, Apr. 29, 2017 (Apr. 29, 2017), pp. 13-23.

(56) References Cited

OTHER PUBLICATIONS

Ulanovskii, et al., “Influence of the mineral components of coal on coke quality (CRI and CRS)”, Coke and Chemistry, vol. 50, No. 4, Apr. 1, 2007 (Apr. 1, 2007), pp. 94-98.
Chen, et al., “Influence of biomass addition on Jincheng coal ash fusion temperatures,” Fuel, vol. 160, 2015, pp. 614-620, ISSN 0016-2361, https://doi.org/10.1016/j.fuel.2015.08.024.
Li, Y., et al. “Assessment on the effect of unburned pulverized coal on the properties of coke in blast furnace.” Ironmaking & Steelmaking. 2020;47(3):228-237.
Rejdak, et al., “A Stamp-Charged Coke-Making Technology—The Effect of Charge Density and the Addition of Semi-Soft Coals on the Structural, Textural and Quality Parameters of Coke,” Energies 2021, 14, 3401. https://doi.org/10.3390/en14123401.
Rejdak, et al., “Use of Alternative Raw Materials in Coke-Making: New Insights in the Use of Lignites for Blast Furnace Coke Production,” Energies. 2020; 13(11):2832. https://doi.org/10.3390/en13112832.
U.S. Appl. No. 18/770,274, filed Jul. 11, 2024, Quanci et al.
U.S. Appl. No. 18/958,671, filed Nov. 25, 2024, Quanci et al.
U.S. Appl. No. 18/954,882, filed Nov. 21, 2024, Choi et al.
U.S. Appl. No. 18/955,181, filed Nov. 21, 2024, Choi et al.
U.S. Appl. No. 18/972,005, filed Dec. 6, 2024, Quanci et al.
U.S. Appl. No. 18/971,912, filed Dec. 6, 2024, Quanci et al.
U.S. Appl. No. 18/977,609, filed Dec. 11, 2024, Quanci et al.
U.S. Appl. No. 19/054,358, filed Feb. 14, 2025, Quanci et al.
“Asbestos”, Virginia Department of Health, https://www.vdh.virginia.gov/environmental-health/public-health-toxicology/asbestos/, updated 2023, 2 pages.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., “Feedback Systems: An Introduction for Scientists and Engineers,” Sep. 16, 2006, available online at http://people/duke.edu/-hpgavin/SystemID/References/Astrom-Feedback-2006.pdf ; 404 pages.
Basset et al., “Calculation of steady flow pressure loss coefficients for pipe junctions,” Proc Instn Mech Engrs., vol. 215, Part C, p. 861-881 IMechIE 2001.
Beckman et al., “Possibilities and limits of cutting back coking plant output,” Stahl Und Eisen, Verlag Stahleisen, Dusseldorf, DE, vol. 130, No. 8, Aug. 16, 2010, pp. 57-67.
Bloom, et al., “Modular cast block—The future of coke oven repairs,” Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Item HT 56107 Briquette, ‘H’ Type Household or Domestic Use, SECV Brown Coal Mine, Yallourn, Victoria, circa 1925, Museums Victoria Collections, https://collections.museumsvictoria.com.au/items/2286568, published on Mar. 2, 2021; 3 pages.
“Ceramic fibers wool—to 1,300°C”, gTeek, Dec. 29, 2017 (date obtained from google search tools), https://www.gteek.com/ceramic-fibers-woolp-to1-300-%C2%B0C, 15 pages.
Chaudhari, K., Cupola Furnace, engineersgalary.com Jan. 24, 2016; 4 pages.
Clean coke process: process development studies by USS Engineers and Consultants, Inc., Wisconsin Tech Search, request date Oct. 5, 2011, 17 pages.
“Conveyor Chain Designer Guild”, Mar. 27, 2014 (date obtained from wayback machine), Renold.com, Section 4, available online at: http://www.renold/com/upload/renoldswitzerland/conveyor_chain _-_ designer_guide.pdf.
Costa, et al., “Edge Effects on the Flow Characteristics in a 90 deg Tee Junction,” Transactions of the ASME, Nov. 2006, vol. 128, pp. 1204-1217.
Crelling, et al., “Effects of Weathered Coal on Coking Properties and Coke Quality”, Fuel, 1979, vol. 58, Issue 7, pp. 542-546.
Database WPI, Week 199115, Thomson Scientific, Lond, GB; AN 1991-107552.
De Cordova, et al. “Coke oven life prolongation—A multidisciplinary approach.” 10.5151/2594-357X-2610 (2015) 12 pages.
Diez, et al., “Coal for Metallurgical Coke Production: Predictions of Coke Quality and Future Requirements for Cokemaking”, International Journal of Coal Geology, 2002, vol. 50, Issue 1-4, pp. 389-412.
“High Alumina Cement-Manufacture, Characteristics and Uses,” TheConstructor.org, https://theconstructor.org/concrete/high-alumina-cement/23686/; 12 pages.
“How Glass Is Made,” Corning, https://www.corning.com/worldwide/en/innovation/materials-science/glass/how-glass-made.html, 2 pages.
Industrial Furnace Design Handbook, Editor-in-Chief: First Design Institute of First Ministry of Machinery Industry, Beijing: Mechanical Industry Press, pp. 180-183, Oct. 1981.
Ishiwata, et al. “Effect of coke diameter and oxygen concentration of blast on cupola operation.” ISIJ International, 2011, vol. 51, pp. 1353-1359.
Ivanova, V. A. “Analysis of the requirements for foundry coke.” IOP Conference Series: Materials Science and Engineering, 2020, vol. 986, pp. 1-6.
Joseph, B., “A tutorial on inferential control and its applications,” Proceedings of the 1999 American Control Conference (Cat. No. 99CH36251), San Diego, CA, 1999, pp. 3106-3118 vol. 5.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., “Overview of Uhde Heat Recovery Cokemaking Technology,” AISTech Iron and Steel Technology Conference Proceedings, Association for Iron and Steel Technology, U.S., vol. 1, Jan. 1, 2005, pp. 25-32.
Knoerzer et al. “Jewell-Thompson Non-Recovery Cokemaking”, Steel Times, Fuel & Metallurgical Journals Ltd. London, GB, vol. 221, No. 4, Apr. 1, 1993, pp. 172-173,184.
Kusiorowski, et al., “Thermal decomposition of different types of abestos,” Journal of Thermal Analysis and Calorimetry • Feb. 2012, 109, 693-704 (2012).
Lin, Rongying et al., “Study on the synergistic effect of calcium and aluminum on improving ash fusion temperature of semi-coke,” International Journal of Coal Preparation and Utilization, May 31, 2019 (published online), vol. 42, No. 3, pp. 556-564.
Lipunov, et al. “Diagnostics of the Heating System and Lining of Coke Ovens,” Coke and Chemistry, 2014, Vopl. 57, No. 12, pp. 489-492.
Madias, et al., “A review on stamped charging of coals” (2013). Available at https://www.researchgate.net/publication/263887759_A_review_on_stamped_charging_of_co als.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
“Middletown Coke Company HRSG Maintenance BACT Analysis Option 1 -Individual Spray Quenches Sun Heat Recovery Coke Facility Process Flow Diagram Middletown Coke Company 100 Oven Case #1 -24.5 VM”, (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.
Office of the Federal Register, National Archives and Records Administration. (Apr. 14, 2005). 70 FR 19992—National Emission Standards for Coke Oven Batteries. [Government]. Office of the Federal Register, National Archives and Records Administration. https://www.govinfo.gov/app/details/FR-2005-04-15/05-6942.
Pearson, D.E., “Influence of Geology on CSR (Coke Strength After Reaction with C02),” 2009, 8 pages.
Practical Technical Manual of Refractories, Baoyu Hu, etc., Beijing: Metallurgical Industry Press, Chapter 6; 2004, 6-30.
Powell, et al. “Cupola Furnaces”, ASM International, downloaded from http://dl.asminternational.org/handbooks/edited-volume/chapter-pdf/501030/a0005197.pdf; 9 pages.

(56) References Cited

OTHER PUBLICATIONS

Refractories for Ironmaking and Steelmaking: A History of Battles over High Temperatures; Kyoshi Sugita (Japan, Shaolin Zhang), 1995, p. 160, 2004, 2-29.
"Refractory Castables," Victas.com, Dec. 28, 11 (date obtained from WayBack Machine), https://www/vitcas.com/refactory-castables; 5 pages.
Rose, Harold J., "The Selection of Coals for the Manufacture of Coke," American Institute of Mining and Metallurgical Engineers, Feb. 1926, 8 pages.
Schlueter, R. "What's so good about coke made from coal, Aug. 29, 2016," Belleview News-Democrat, Rschuleter@bnd.com; 4 pages.
Seal School, Coal v. Coke|Fast differences and Comparison. Viewable on YouTube (Year:2020).
Tiwari, et al., "A novel technique for assessing the coking potential of coals/cole blends for non-recovery coke making process," Fuel, vol. 107, May 2013, pp. 615-622.
Waddell, et al., "Heat-Recovery Cokemaking Presentation," Jan. 1999, pp. 1-25.
Walker D N et al., "Sun Coke Company's heat recovery cokemaking technology high coke quality and low environmental impact", Revue De Metallurgie—Cahiers D'informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.
Yu et al., "Coke Oven Production Technology," Lianoning Science and Technology Press, first edition, Apr. 2014, pp. 356-358.
"Resources and Utilization of Coking Coal in China," Mingxin Shen ed., Chemical Industry Press, first edition, Jan. 2007, pp. 242-243, 247.
High Quality Qualified Customized Low Ash Sulfur Foundry Coke, Rizhaq Hengqiao Carbon Co., Ltd. 2012 (Year: 2021).
Ratanakuakangwan, S. "Comparison of metallurgical coke and ignite coke for power generation in Thailand," IOP Conference Series: Material Science Engineering, vol. 191, 012048, 2017, pp. 1-6.

* cited by examiner

SYSTEMS, DEVICES AND METHODS FOR SCREENING INDUSTRIAL PRODUCTS

CROSS-REFERENCE TO RELATED APPLICATION(S)

The present application claims the benefit of U.S. Provisional Patent Application No. 63/601,421, filed Nov. 21, 2023, the disclosure of which is incorporated herein by reference in its entirety.

TECHNICAL FIELD

This present disclosure relates to systems, devices and methods for screening industrial products. Some embodiments relate to systems, devices and methods for screening coke products.

BACKGROUND

Coke is a solid carbon fuel and carbon source used to melt and reduce iron ore in the production of steel. To make coke, finely crushed coal is fed into a coke oven and heated in an oxygen-depleted environment under closely controlled atmospheric conditions. Such an environment drives off volatile compounds in the coal, leaving behind coke. In some coking plants, once the coal is "coked out" or fully coked, an oven door is opened and the hot coke is transported from the coke oven to a quenching area (e.g., wet or dry quenching) to cool the coke below its ignition temperature. After being quenched, the coke is screened (e.g., based on size) and loaded into rail cars or trucks for shipment or later use.

The size of the coke used in foundry cupolas has an impact on the heating value of the process. Generally, coke with a large size and a uniform size distribution is desirable for a more controlled heating. Avoiding excessive degradation in size is also desirable. Coke may also get stuck in a screener during the screening process, resulting in a reduction in the amount of screened coke and interference with subsequent screening. Therefore, there is a need for a screener that can consistently screen materials, such as coke products, based on a desired size threshold without becoming stuck in the screener.

BRIEF DESCRIPTION OF THE DRAWINGS

Features, aspects, and advantages of the presently disclosed technology may be better understood with regard to the following drawings.

Figure 1A:
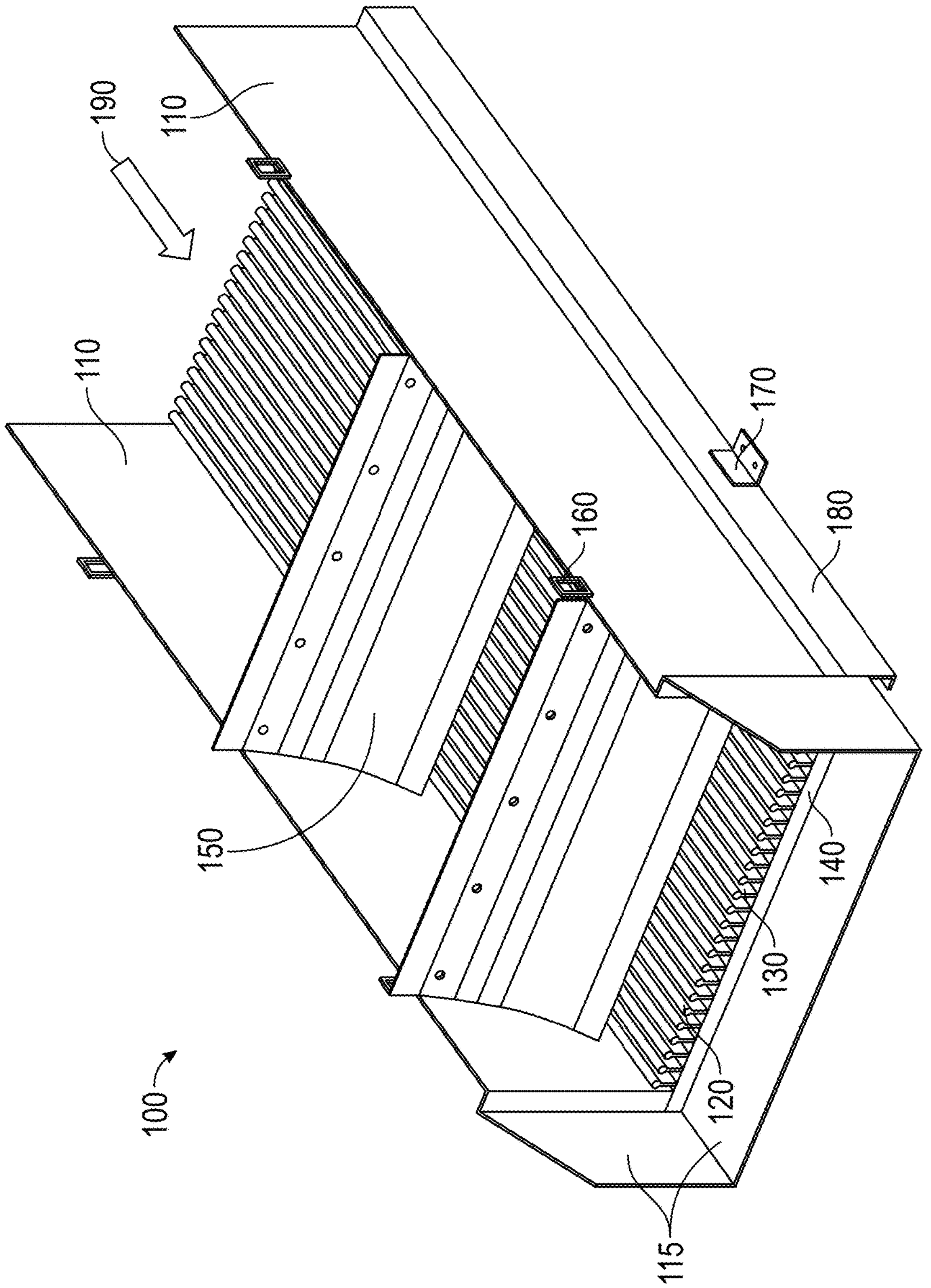
FIG. 1A is a perspective view of a screener in accordance with embodiments of the present technology.
Figure 1B:
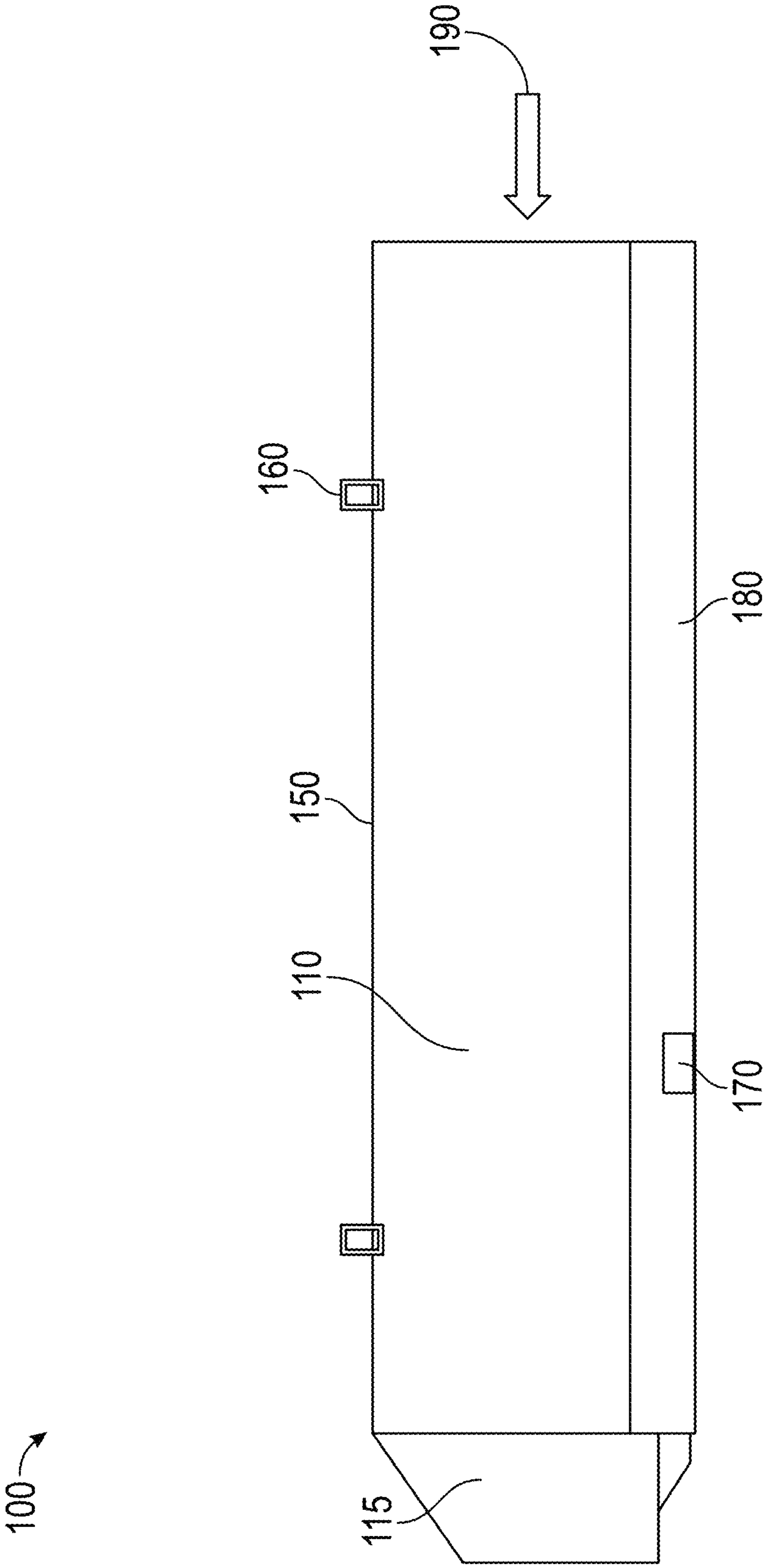
FIG. 1B is a side view of the screener of FIG. 1A.
Figure 1C:
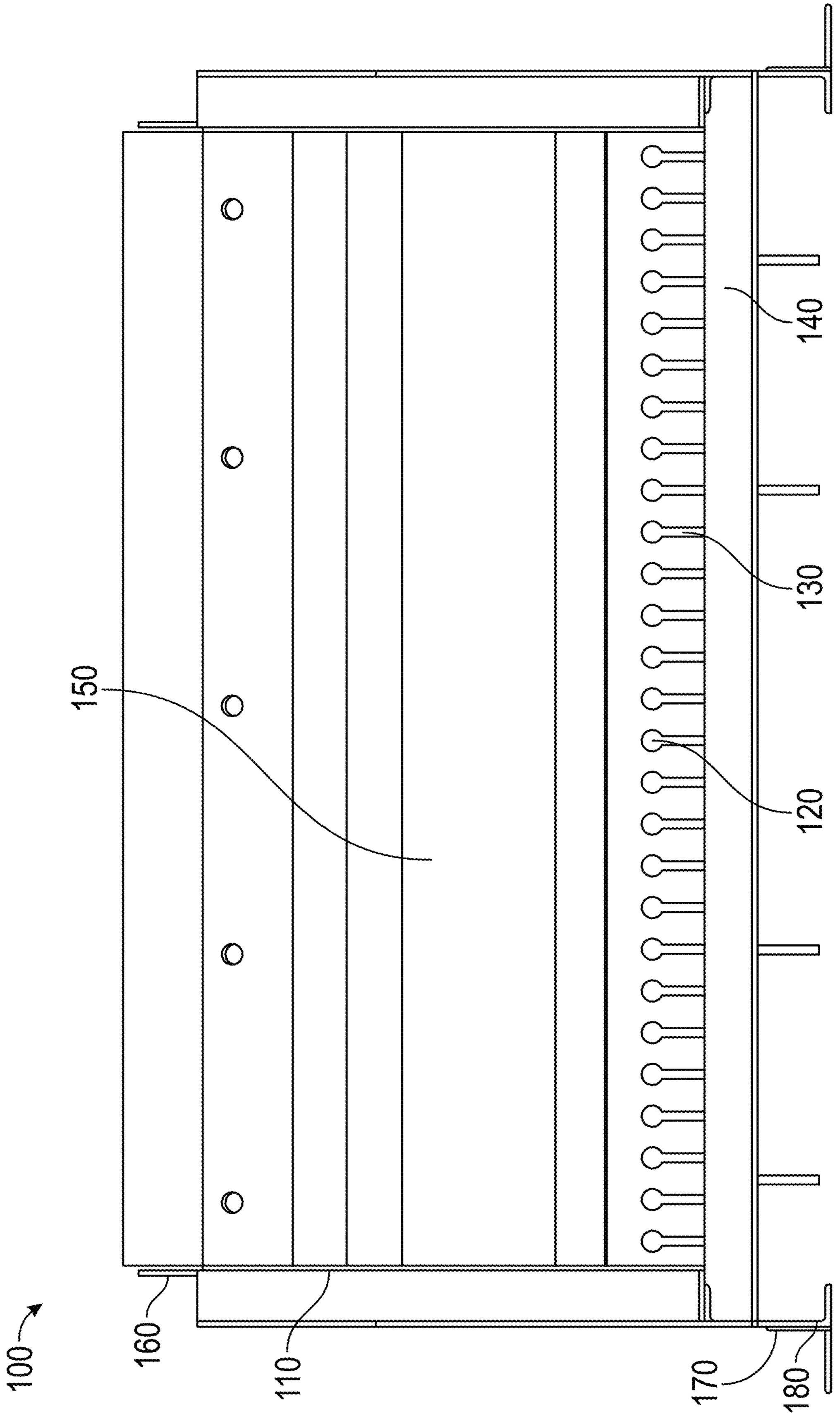
FIG. 1C is a front view of the screener of FIG. 1A.

A person skilled in the relevant art will understand that the features shown in the drawings are for purposes of illustrations, and variations, including different and/or additional features and arrangements thereof, are possible.

DETAILED DESCRIPTION

I. Overview

Embodiments of the present disclosure relate to systems and methods for screening industrial products, such as coke, foundry coke, and/or granulated pig iron. The coking process produces coke products of various sizes in different fractions. Conventionally, the coke products are classified based on size, with foundry coke having a size of 4"+, egg (industrial coke) having a size of 2-4", stove having a size of 1-2" or 1-1.5", nut having a size of 0.5-1", and breeze having a size<0.5". After production, the coke products are screened, e.g., to separate the foundry coke and egg, from the other products of the batch. However, filtering just certain products (e.g., the foundry coke and/or egg) can be difficult, as the shape and size of the overall production can cause plugging. For example, using a large perforated screen or slotted plates results in plugging which inhibits or prevents effective filtering of the smaller products. Embodiments of the present disclosure address at least some of the above-described issues, and include (i) a screener apparatus comprising a screening member extending along a first axis, wherein the screening member is configured to make contact with a material to be screened, (ii) an elevating member extending along the first axis, wherein the elevating member is coupled to a lower portion of the screening member, and (iii) a cross support extending along a second axis angled relative to the first axis, wherein the cross support is coupled to a lower portion of the elevating member.

Additionally or alternatively, embodiments of the present disclosure can also include a device for screening materials. The device can comprise a filtering device comprising a plurality of screening elements and a cross support coupled to the plurality of screening elements, wherein each of the plurality of screening elements includes a first portion and a second portion coupled to a lower region of the first portion, wherein the first portion has a first cross-sectional dimension and the second portion has a second cross-sectional dimension less than the first cross-sectional dimension, and wherein each of the plurality of screening elements is spaced apart from an adjacent screening element by a distance of, for example, at least 0.5 inch.

Embodiments of the present disclosure also include a method of screening a material, comprising providing a filtering device including a plurality of screening elements and a cross support coupled to the plurality of screening elements, wherein each of the plurality of screening elements includes a first portion and a second portion coupled to a lower region of the first portion, wherein the first portion has a first cross-sectional dimension and the second portion has a second cross-sectional dimension less than the first cross-sectional dimension, and wherein each of the plurality of screening elements is spaced apart from an adjacent screening element by a distance of, for example, at least 0.5 inch, and contacting the plurality of screening elements with the material.

Embodiments of the present disclosure enable industry products, such as foundry coke, being screened to slide across a plurality of screening elements of a screener at least in part due to gravity (e.g., by being positioned at an angle). The plurality of screening elements are configured (e.g., sized and spaced apart from one another) such that industrial products below a certain size drop in between the screening elements, while other industrial products that do not drop slide to an end portion of the screener and are transported for further processing and/or use (e.g., via a belt). A first portion of each of the plurality of screening elements that contacts the industrial products is separated and/or elevated from one or more cross support members of the screener by a second portion of each of the plurality of screening elements (e.g., that does not contact the industrial products), such that the industrial products do not become stuck while traveling across the screener. The second portions of the screening elements are separated by a lateral distance greater than the lateral distance separating the first portions of the screening elements such that only the first portions affect the size threshold for screening.

In the Figures, identical or similar reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Systems, Device and Methods for Screening Industrial Products

Figure 1E:
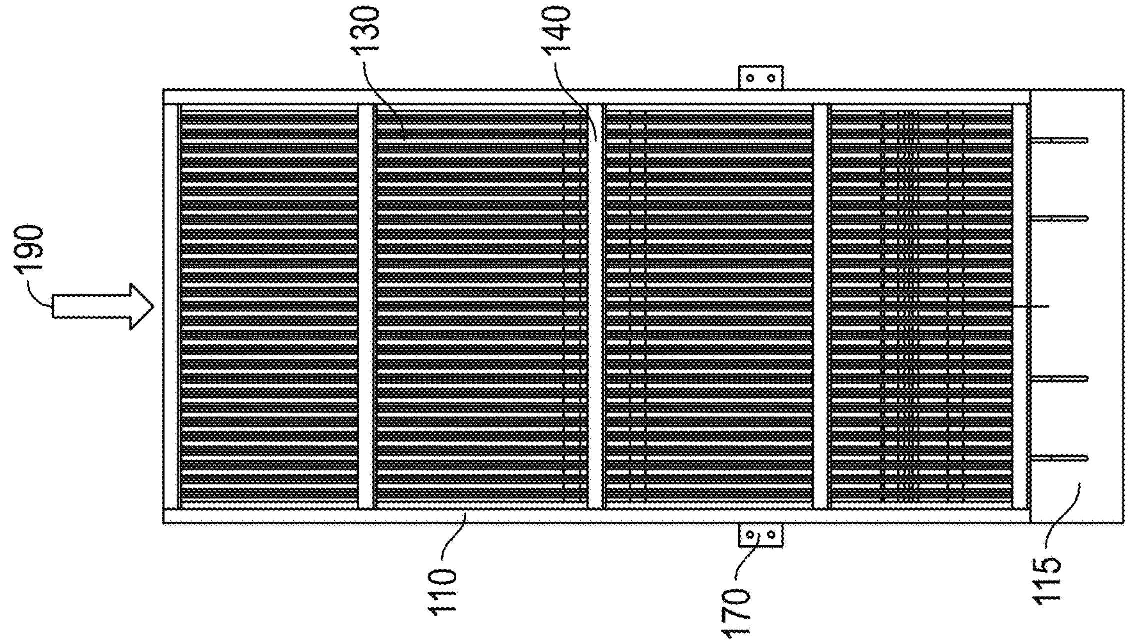
FIG. 1E is a bottom-up view of the screener of FIG. 1A.
Figure 1D:
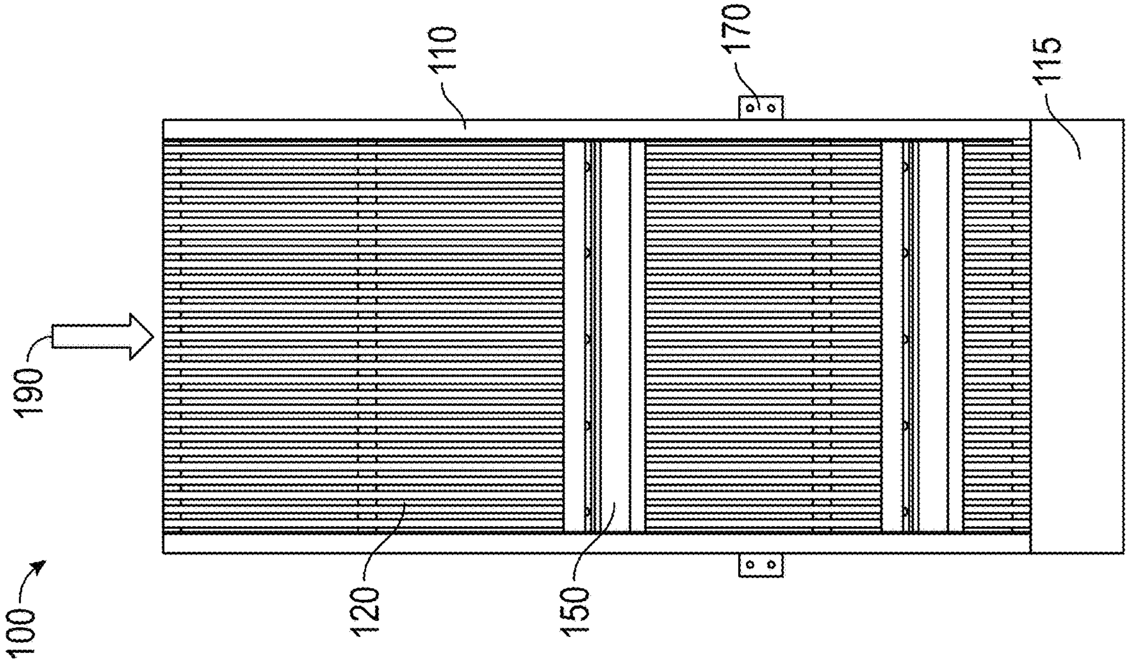
FIG. 1D is a top-down view of the screener of FIG. 1A.

FIGS. 1A, 1B, 1C, 1D, and 1E are perspective, side, front, top-down, and bottom-up views, respectively, of a screener apparatus (and/or device) 100, in accordance with embodiments of the present technology. Referring to FIGS. 1A-1E together, the screener apparatus 100 has a plurality of screening elements 102, each of which includes a screening member (e.g., first portion) 120 and an elevating member (e.g., second portion) 130 coupled to and/or extending from a lower portion and/or region of the screening member 120. The screening member 120 and elevating member 130 can comprise a continuous surface and be a single contiguous structure. The screener apparatus 100 also has one or more cross supports 140 coupled to a lower portion and/or region of the elevating member 130. Coupling the elevating member 130 to the lower portion of the one or more cross supports 140, as opposed to a side portion of the elevating member 130 or screening member 120, can advantageously ensure that the cross supports 140 do not provide an area for the industrial products to become plugged. The screening members 120 and the elevating members 130 extend along a first axis, and the cross supports 140 extend along a second axis angled (e.g., perpendicular, 45 degrees, 60 degrees) relative to the first axis, as seen in FIG. 1E.

The screener apparatus 100 includes two side wall portions 110 that extend generally along the first axis on either side of the plurality of screening elements 102. Lift brackets 160, which assist in transporting the screener apparatus 100, are coupled to upper portions of the side wall portions 110. One or more flaps 150 are coupled to the side wall portions 110 such that the flaps 150 are disposed over the plurality of screening elements 102. The flaps 150 can have shapes different from the illustrated embodiment. Side guides 180 are further coupled to the side wall portions 110. Connecting brackets 170 are configured to fixedly attach the side guides 180 to a support structure (illustrated in FIG. 3) such that the screener apparatus 100 can be positioned or orientated in a desired manner. The screener apparatus 100 further comprises outlet guides 115 configured to receive the screened material and/or guide the screened material to another equipment (e.g., a belt for transporting coke).

In operation, foundry coke, for example, is transported (e.g., after being quenched) onto the screener apparatus 100 in any direction, including a travel direction 190 (e.g., manually, via a belt). The travel direction is parallel to or generally aligned with the first axis in which the plurality of screening elements 102 extend. The screener apparatus 100 can be angled relative to a direction of gravity by, for example, 10-80 degrees, to cause the foundry coke to slide down the screening members 120 at least in part due to gravity. The screener apparatus 100 can also be vibrated to facilitate sliding of the foundry coke atop the screening members 120. The side wall portions 110 keep the foundry coke within the screener apparatus 100, and the flaps 150 decrease a velocity of the foundry coke, thereby improving the screening ability of the screener apparatus 100. As the foundry coke slides down the length of the screener apparatus 100 in the travel direction 190, some products (e.g., stove, nut, breeze, etc.) that are small enough fall down in between the screening members 120 and past the elevating members 130 and the cross supports 140 to a disposal area (e.g., on the ground, a collection vessel, etc.). The remaining products (e.g., foundry coke, egg, etc.) that did not fall through exit the screener apparatus 100 via the outlet guides 115 to be transported for further processing and/or use (e.g., via a belt).

Figure 2:
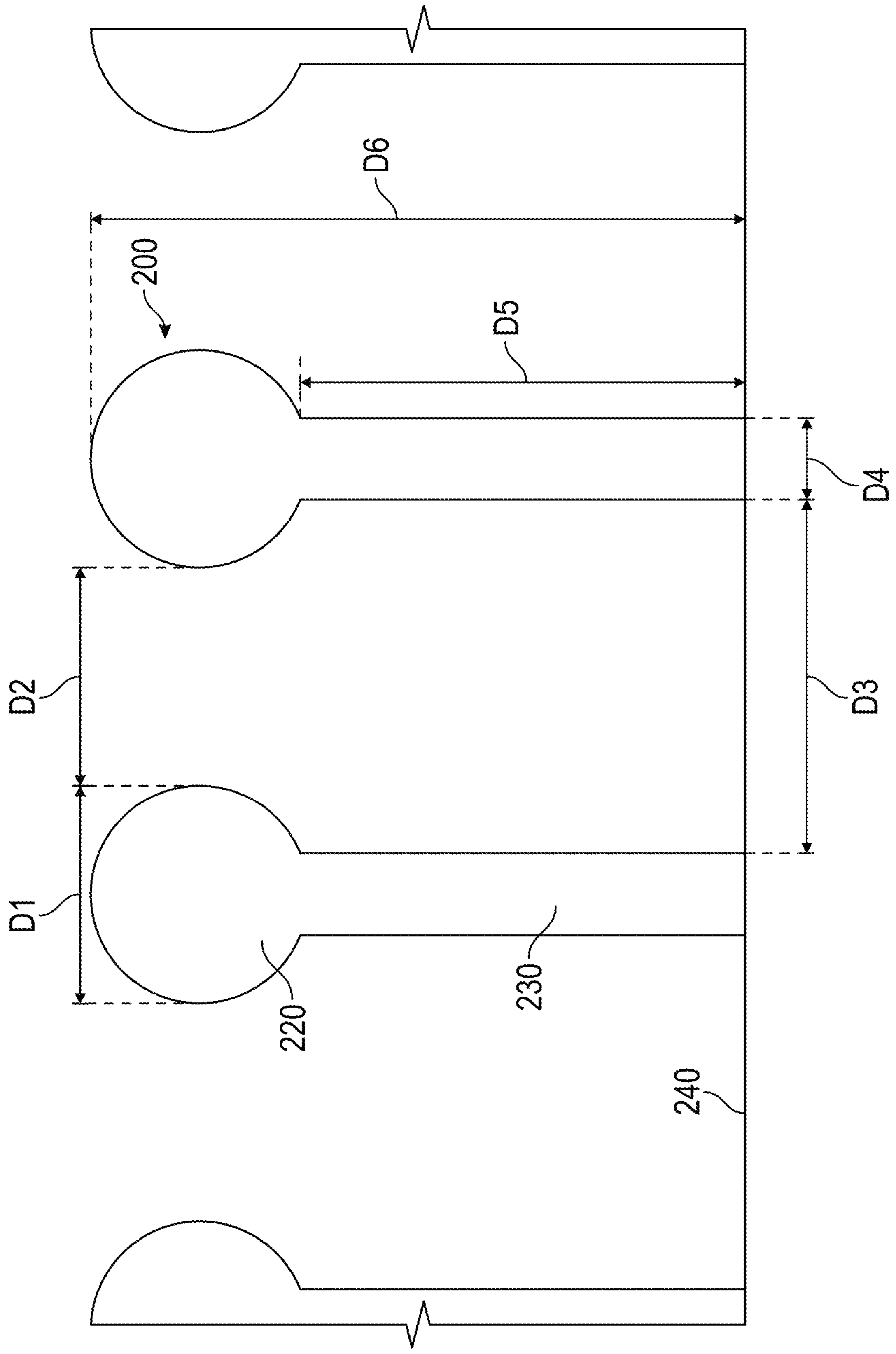
FIG. 2 is a simplified plan view of screening elements in accordance with embodiments of the present technology.

FIG. 2 is a plan view of a plurality of the screening elements 102 referred to in FIGS. 1A-1E, in accordance with embodiments of the present technology. As shown in FIG. 2, the plurality of screening elements 102 sit atop the one or more cross supports 140. As previously described, each of the screening elements 102 includes the screening member 120 and the elevating member 130 coupled to a lower portion of the screening member 120. In the illustrated embodiment, the screening member 120 is a rod with a circular cross-section and/or curved outer surface, and the elevating member 130 is a bar with a rectangular cross-section. The circular cross-section and/or curved outer surface of the screening member 120, in combination with other features of the screening apparatus 100 (FIGS. 1A-1E), can help inhibit or prevent plugging of the areas between the screening elements 102 with industrial product. In some embodiments, the screening member 120 and the elevating member 130 have other cross-sections and/or shapes (e.g., an inverted triangle with a flat portion positioned to contact the industrial product). The elevating member 130 can be coupled to the screening member 120 via fasteners and/or welding. The screening member 120 can be fixedly coupled to the elevating member 130 along an entire length of the screening member 120.

The screening member 120 has a first cross-sectional dimension (e.g., diameter) D1. Each of the screening members 120 is spaced apart from an adjacent screening member 120 by a screening distance D2. The elevating member 103 has a second cross-sectional dimension (e.g., thickness) D4 smaller than the first cross-sectional dimension D1. Each elevating member 130 is spaced apart from an adjacent elevating member 130 by an elevating member separation distance D3.

In operation, the industrial products are screened (e.g., by size and/or shape) such that small enough products fall in between individual screening elements 102. The first cross-sectional dimension D1 and the screening distance D2 can be determined based on the desired threshold screening size of the industrial products. For example, the first cross-sectional dimension D1 can be at least 0.5 inch, 1.0 inch, 1.5 inches, or 0.5-1.5 inches and the screening distance D2 can be at least 0.1 inch, 0.5 inch, 1.0 inch, 1.5 inches, 2.0 inches, or 0.1-2 inches. Any combination of the first cross-sectional dimension D1 and the screening distance D2 can be used.

The second cross-sectional dimension (e.g., thickness) D4 is less than the first cross-sectional dimension D1 (i.e., the elevating member separation distance D3 is greater than the screening distance D2) such that the elevating members 130 do not affect the screening size threshold. In other words, although some industrial products may contact the elevating members 130 while falling, the elevating members 130 are configured not to impact whether the industrial product falls or not. The second cross-sectional dimension D4 can be at least 0.25 inch, 0.375 inch, 0.5 inch, 0.625 inch, 0.75 inch, 1.0 inch, or 0.25-1.0 inch.

The elevating member 130 is configured to separate (e.g., elevate) the screening member 120 from the cross supports 140 by a third cross-sectional dimension (e.g., height) D5. The third cross-sectional dimension D5 can be at least 1.0 inch, 2.0 inches, 3.0 inches, or 1.0-3.0 inches. Once the elevating member 130 is coupled to the screening member 120, each screening element 102 has a screening height D6.

The screening elements 102 provide several advantages. For example, the circular cross-section of the screening member 120 allows the industrial products to travel generally between two adjacent screening members 120 as opposed to travelling atop a single screening member 120 or a perforated plate that can trap material on its ridges. This ensures that small enough industrial products do fall and the industrial products are screened properly. The rectangular cross-section of the elevating member 130 allows separation of the screening member 120 and the cross supports by any predetermined distance (i.e., the third cross-sectional dimension D5) without having the elevating member 130 interfere with the screening. The separation prevents the cross supports 140 from interfering with the industrial products traveling atop the screening members 120. Without sufficient separation, industrial products may become stuck due to the cross supports 140. Moreover, the cross-sections of the screening member 120 and the elevating member 130 allow case of manufacturing (e.g., using metal such as stainless steel). The screening members 120, the elevating members 130, and the cross supports 140 can also be coupled via fasteners and/or welding. Furthermore, the screening distance D2 can be easily fixed or adjusted based on evolving screening needs.

Figure 3:
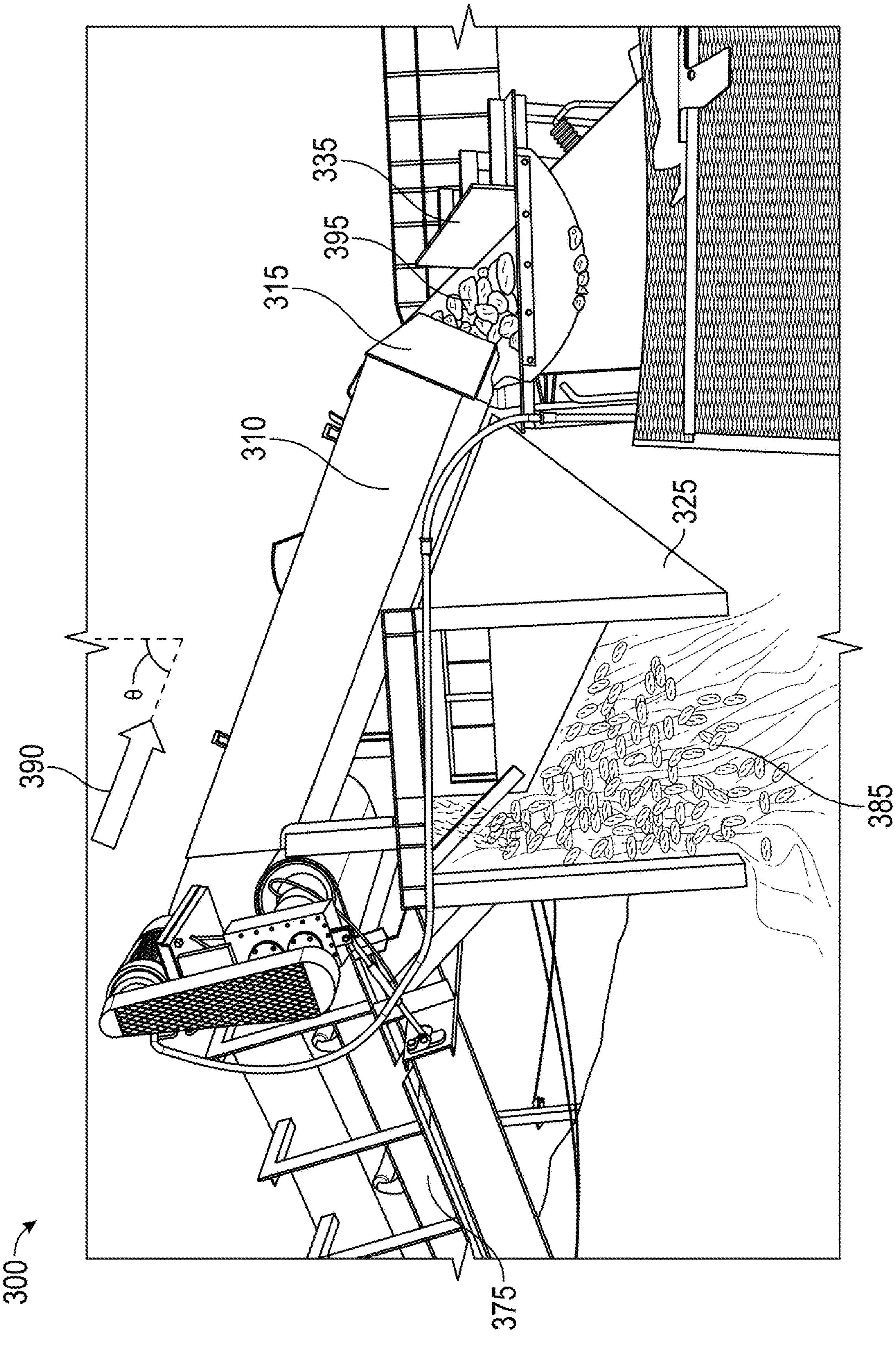
FIG. 3 is a side view of a screener in accordance with embodiments of the present technology.

FIG. 3 is a side view of a screener apparatus 300, in accordance with embodiments of the present technology. The screener apparatus 300 can correspond to the screener apparatus 100 described with reference to FIGS. 1A-2. The screener apparatus 300 is supported by a support structure 325 and industrial products are transported onto the screener apparatus 300 by a loading belt 375. The industrial products travel through the screener apparatus 300 in a travel direction 390 that is at a screener angle θ relative to a direction of gravity. The screener angle θ can be at least 30 degrees, 40 degrees, 50 degrees, 60 degrees, 70 degrees, 80 degrees, or 30-80 degrees, which allows the industrial products to slide through the screener apparatus 300 solely or at least in part due to gravity. The screener apparatus 300 can also be vibrated to facilitate sliding of the industrial products.

As the industrial products are screened, and contained by side wall portions 310 (e.g., the side wall portions 110; FIGS. 1A-1E), insufficiently large industrial products 385 fall through into a disposal area defined by the support structure 325. Sufficiently large industrial products travel to the other end of the screener apparatus 300 and are guided by outlet guides 315 (e.g., the outlet guides 115; FIGS. 1A-1E) onto a transport belt 395 for further processing and/or use. A side plate 335 is positioned proximate to the transport belt 395 to prevent industrial products coming out of the screener apparatus 300 from falling beyond the transport belt 395. Flaps (not shown in FIG. 3) are configured to decrease a velocity of the industrial products such that the screened industrial products do not break up into smaller pieces upon hitting the side plate 335.

Figure 4:
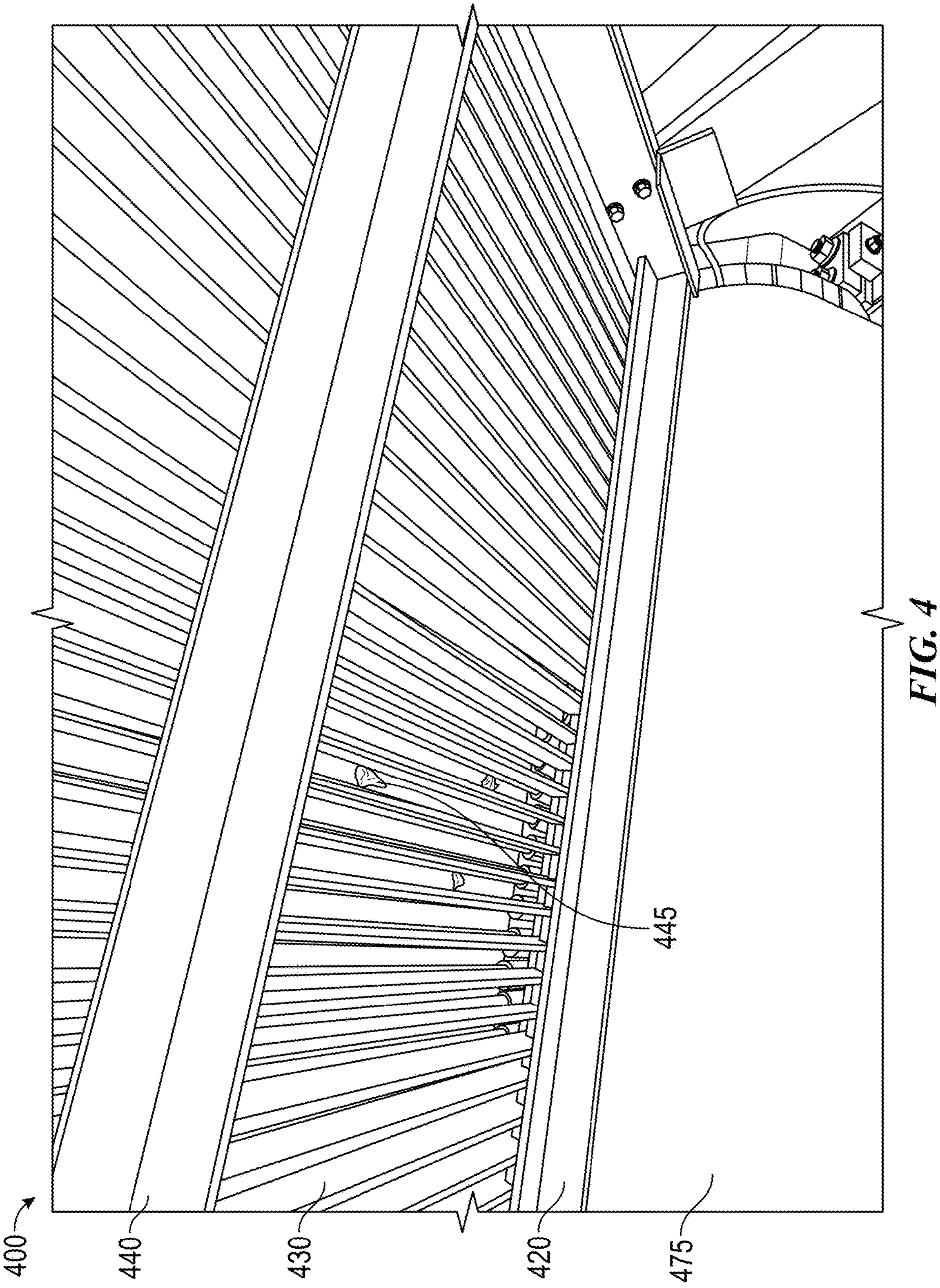
FIG. 4 is a bottom-up view of a screener in accordance with embodiments of the present technology.

FIG. 4 is a bottom-up view of the screener apparatus 300, in accordance with embodiments of the present technology. Once industrial products are loaded onto the screening elements 302 (e.g., the screening elements 102; FIGS. 1A-2) of the screener apparatus 300 by a loading belt 375, the industrial products travel atop screening members 320 (e.g., the screening members 120; FIGS. 1A-2), which are separated from cross supports 340 (e.g., the cross supports 140; FIGS. 1A-2) by elevating members 330 (e.g., the elevating members 130; FIGS. 1A-2) to avoid having industrial products get stuck and cause backup. Sufficiently large industrial products 345 travel between individual screening members 320, but do not fall through.

Figure 5:
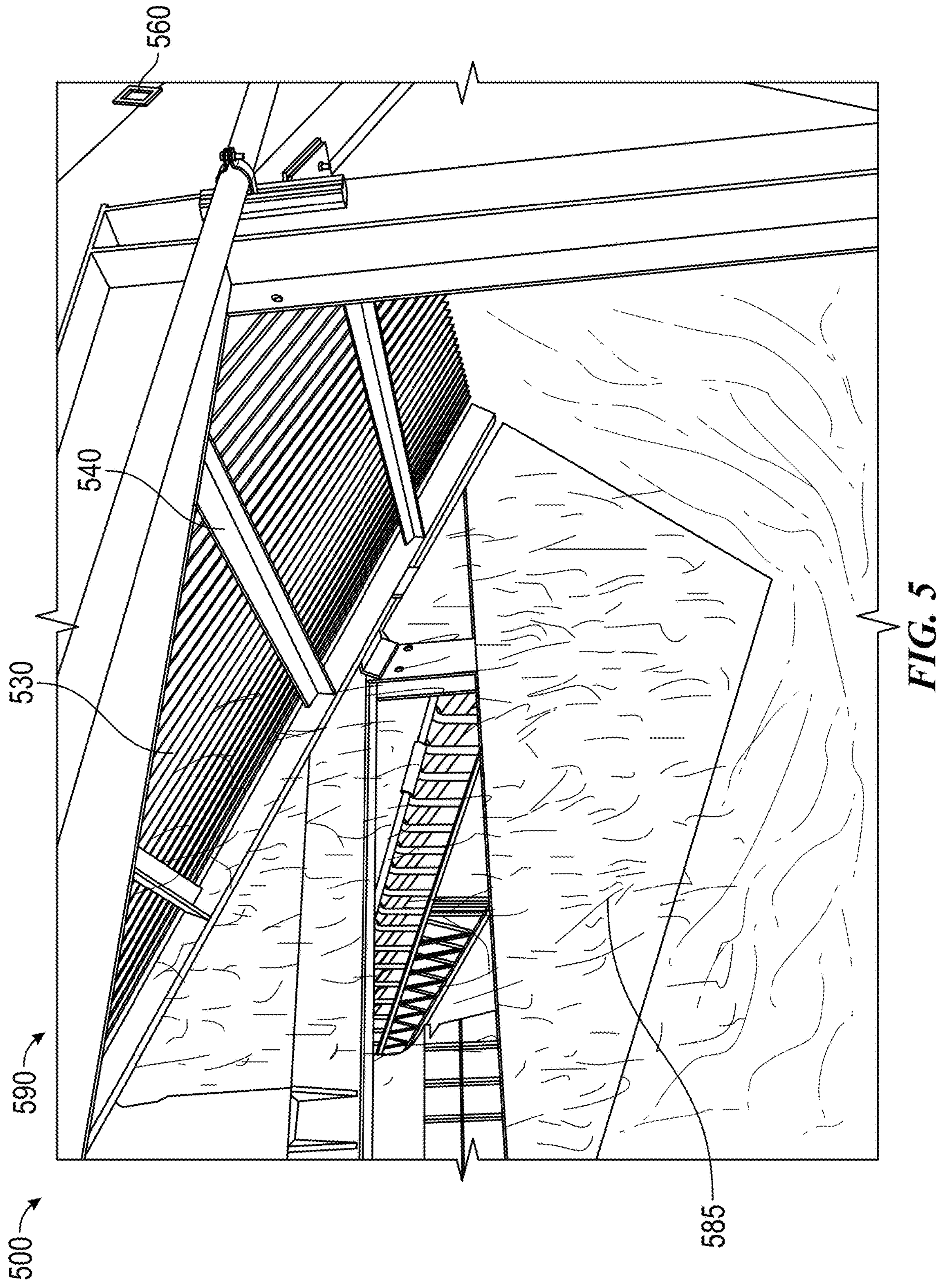
FIG. 5 is a side view of a screener in accordance with embodiments of the present technology.

FIG. 5 is a side view of the screener apparatus 300, in accordance with embodiments of the present technology. Industrial products travel atop screening members (not shown in FIG. 5) and elevating members 330, which are supported by cross supports 340. As the industrial products travel in the travel direction 390, insufficiently large industrial products 385 fall through to a disposal area. The screener apparatus 300 includes one or more lift brackets 360 (e.g., the lift brackets 160; FIGS. 1A-1E) configured to assist in transporting the screener apparatus 300.

Figure 6:
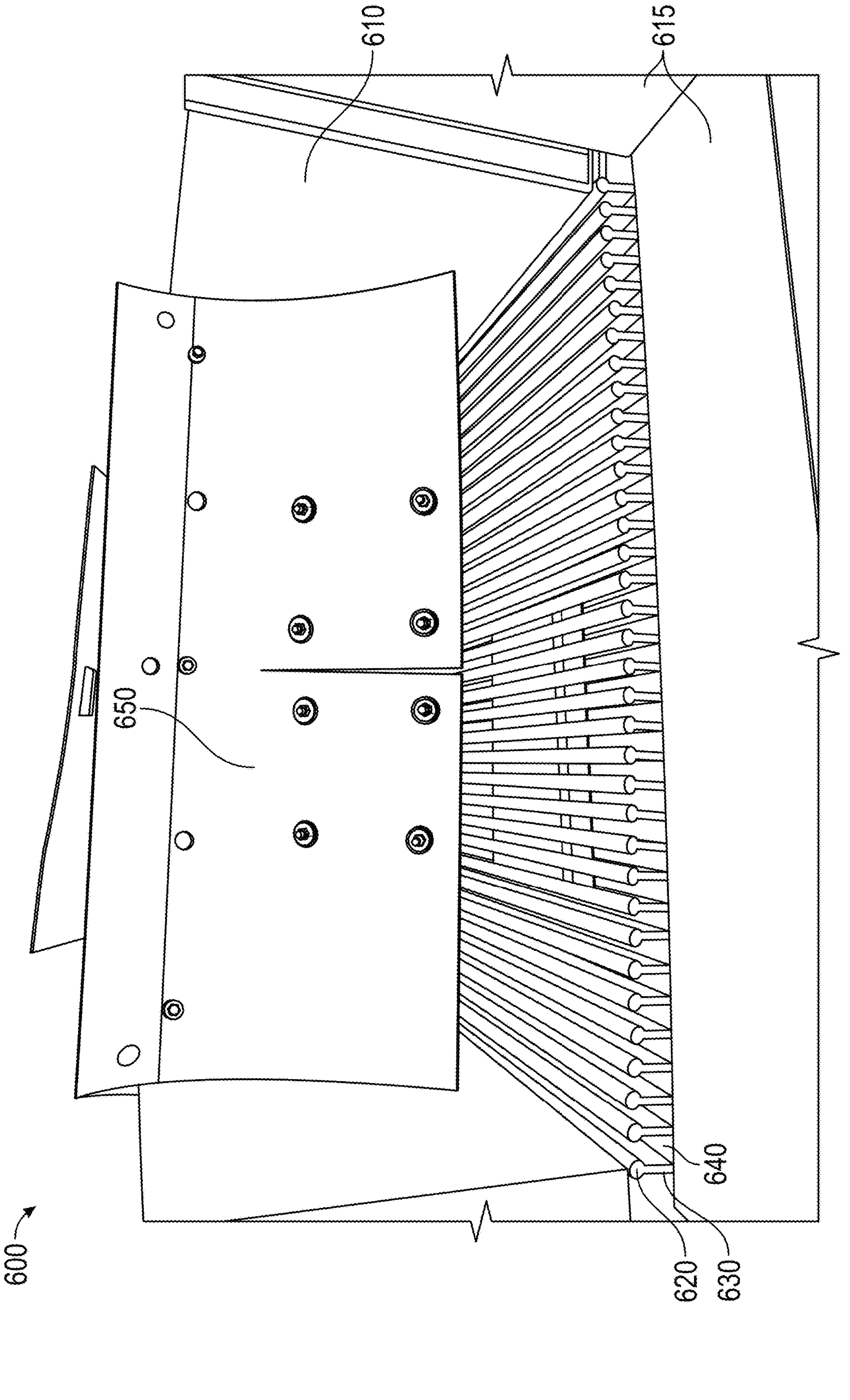
FIG. 6 is a front view of a screener in accordance with embodiments of the present technology.

FIG. 6 is a front view of a screener apparatus 300, in accordance with embodiments of the present technology. Screening members 320 are rods with circular cross-sections, and are welded to elevating members 330, which are bars with rectangular cross-sections. The elevating members 330 are welded to one or more cross supports 340, which extend from one side wall portion 310 to another in a direction generally perpendicular to the direction in which the screening members 320 and elevating members 330 extend. In some embodiments, the screening members 320, the elevating members 330, and the cross supports 340 are coupled to one another via other means (e.g., fasteners).

The screener apparatus 300 can include one or more flaps 350 (e.g., the flaps 150; FIGS. 1A-1E) disposed over the screening elements 302. The flaps 350 can be made of metal and/or rubber, and are configured to decrease a velocity of the industrial products such that the screened industrial products do not break up into smaller pieces upon exiting the screener apparatus 300 via outlet guides 315 and hitting the side plate 335 (shown in FIG. 3). In the illustrated embodiment, each of the flaps 350 is coupled to a flap bar coupled to the side wall portions 310.

Figure 7:
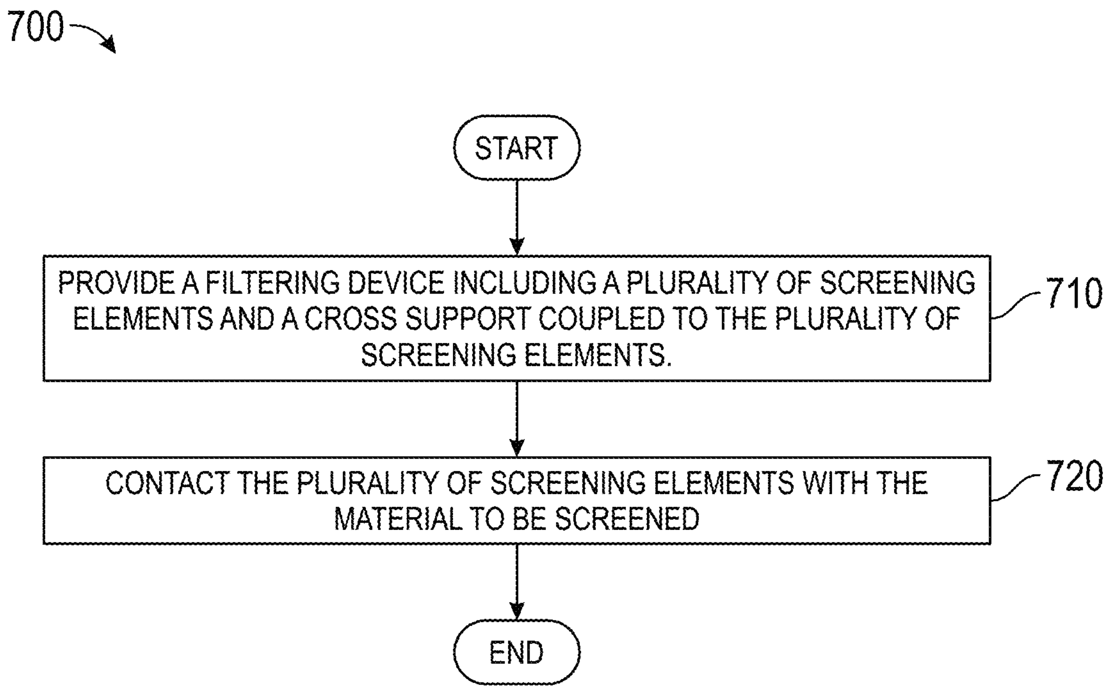
FIG. 7 is a flow diagram illustrating a method of screening materials in accordance with embodiments of the present technology.

FIG. 7 is a flow diagram illustrating a method 700 of screening materials in accordance with embodiments of the present technology. The method comprises providing a filtering device (e.g., the screening apparatus 100, 300) including a plurality of screening elements (e.g., the screening elements 102, 302) and a cross support (e.g., the cross support 140, 340) coupled to at least some of the plurality of screening elements (process portion 710). Each of the plurality of screening elements includes a first portion (e.g., the screening member 120, 320) and a second portion (e.g., the elevating member 130, 330) coupled to a lower region of the first portion. The first portion has a first cross-sectional dimension (e.g., the first cross-sectional dimension D1), and the second portion has a second cross-sectional dimension (e.g., the second cross-sectional dimension D4) less than the first cross-sectional dimension. Each of the plurality of screening elements is spaced apart from an adjacent screening element by a distance of, for example, at least 0.5 inch.

The method 700 further comprises contacting the plurality of screening elements with the material (e.g., industrial products, foundry coke, etc.) to be screened (process portion 720). In some embodiments, a loading belt is used to transport the material to be screened onto the plurality of screening elements.

In some embodiments, the method 700 includes additional steps not illustrated in FIG. 7. The additional steps may come before, after, or between process portions 710 and 720. In some embodiments, the method 700 may further include angling the plurality of screening elements perpendicular to the cross support and/or at an angle (e.g., between 30-80 degrees) relative to a direction of gravity. In some embodiments, the method 700 may further include sliding the material over the plurality of screening elements such that a portion of the material falls in between individual screening elements.

Figure 8:
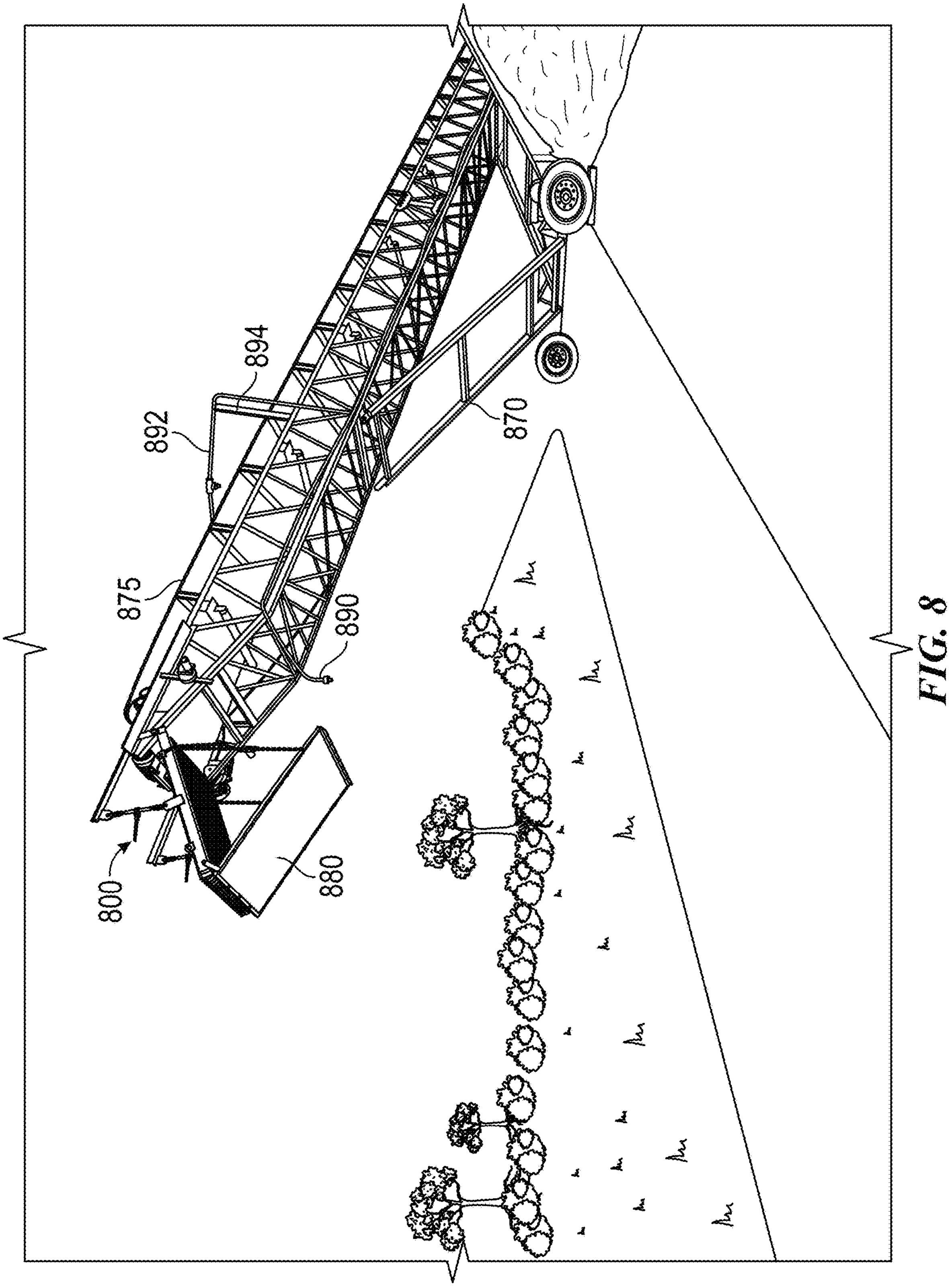
FIG. 8 is a side view of a screener mounted on an end of a loading belt in accordance with embodiments of the present technology.
Figure 9:
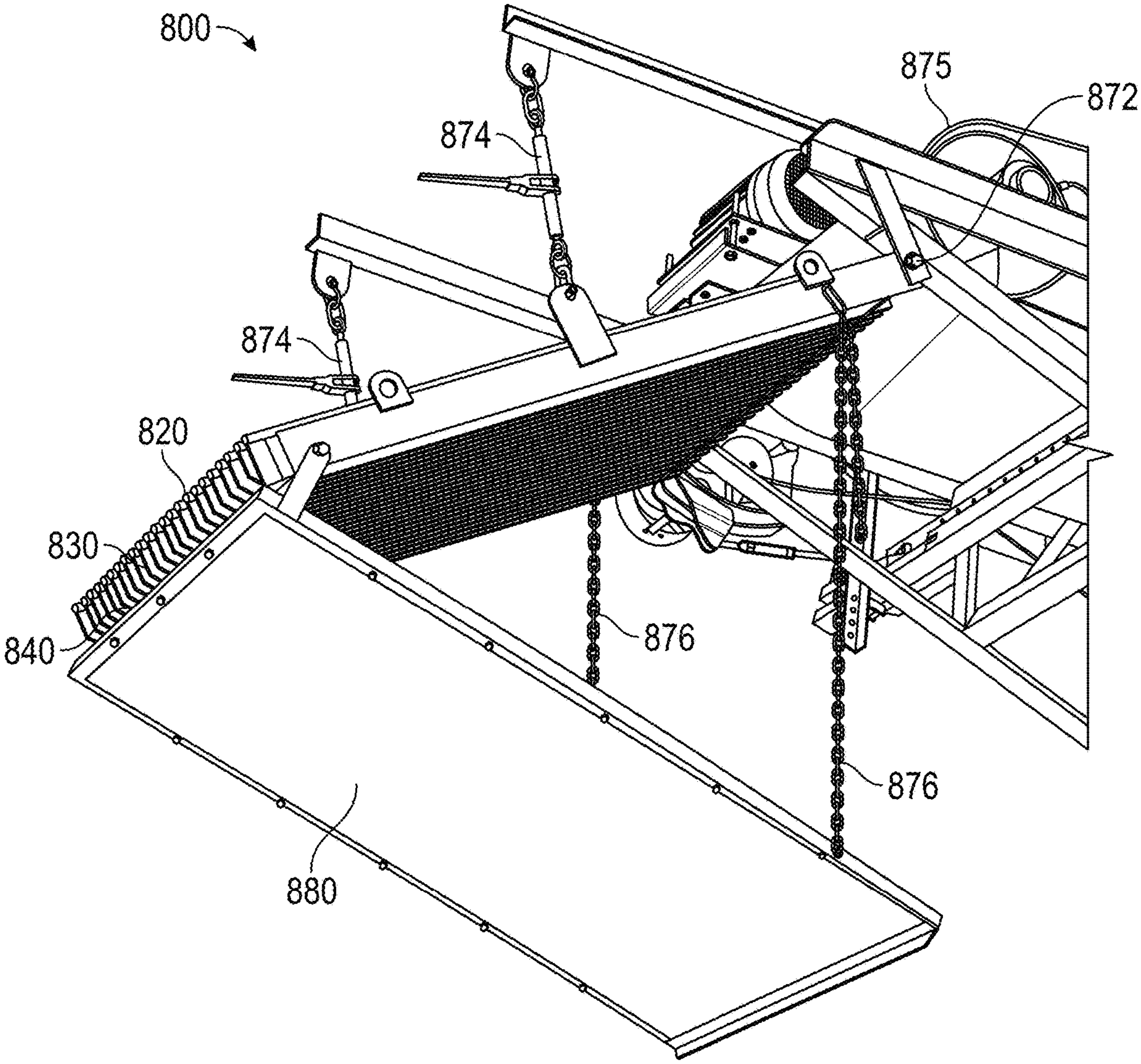
FIG. 9 is an enlarged side view of a screener mounted on an end of a loading belt in accordance with embodiments of the present technology.
Figure 10:
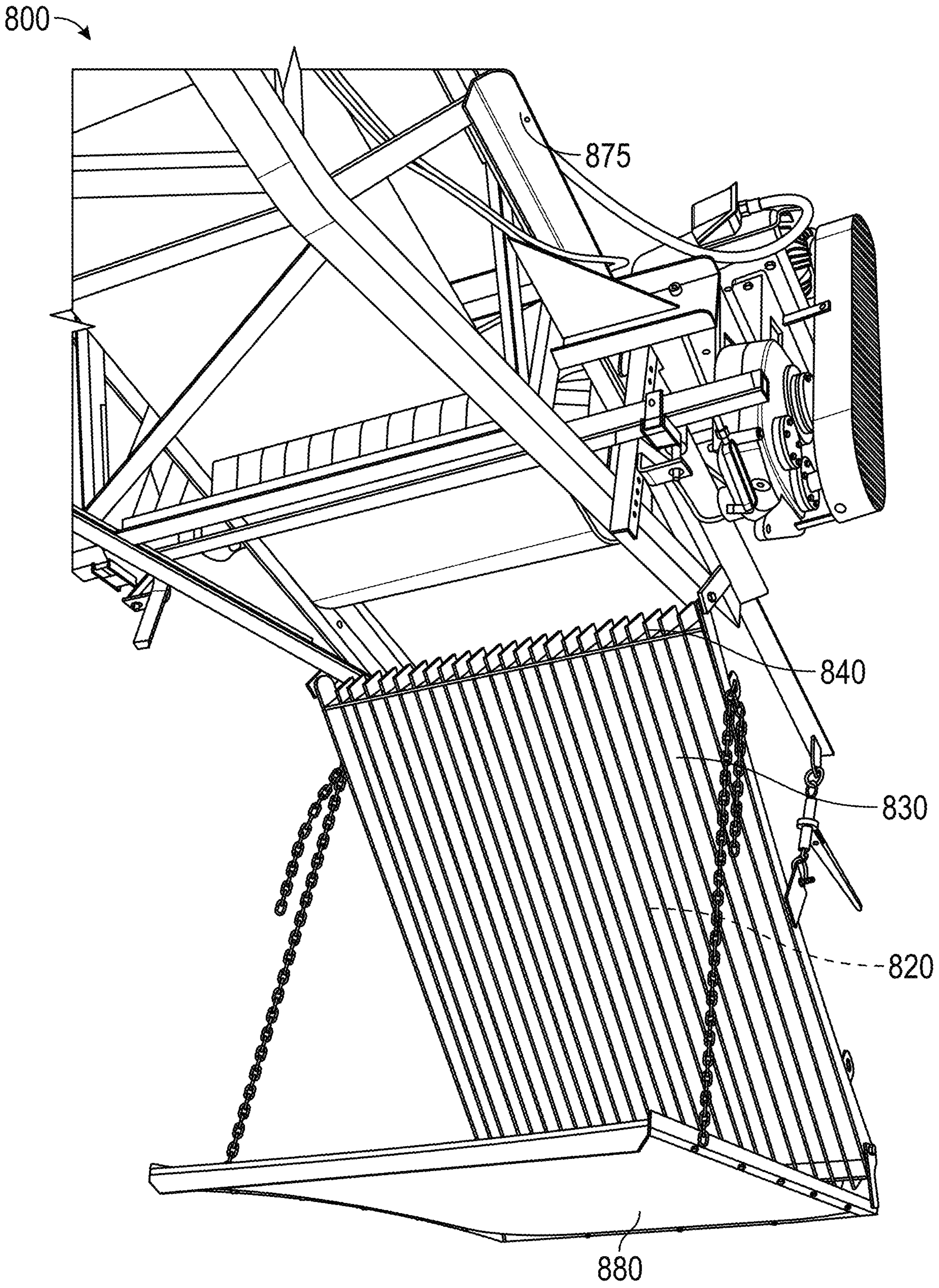
FIG. 10 is an enlarged bottom-up view of a screener mounted on an end of a loading belt in accordance with embodiments of the present technology.

FIG. 8 is a side view of a screener apparatus 800 mounted on an end of a loading belt 875, in accordance with embodiments of the present technology. FIG. 9 is an enlarged side view of the screener apparatus 800, in accordance with embodiments of the present technology. FIG. 10 is an enlarged bottom-up view of the screener apparatus 800 mounted on an of a belt in accordance with embodiments of the present technology.

Referring to FIGS. 8-10 together, the screener apparatus 800 can correspond to the screener apparatus 100 described with reference to FIGS. 1A-2. The loading belt 875 can correspond to the loading belt 375 described with reference to FIGS. 3-6. By using the screener apparatus 800 and the loading belt 875, industrial products (e.g., coke or foundry coke) can be screened by size and loaded onto various vehicles or facilities for use or further processing. For example, products in a railcar (not shown) can be loaded onto the belt 875, dropped onto and screened via the screener apparatus 800, and dropped onto a loading truck (not shown).

The screener apparatus 800 is coupled to a pivot point 872 proximate to the end of the loading belt 875, which is lifted at an angle by a belt transporter 870. The screener apparatus 800 can be oriented at an angle relative to the belt 875 by adjusting connectors (e.g., chains) 874. The screener apparatus 800 includes screening members 820 (e.g., the screening members 120; FIGS. 1A-2), which are separated from cross supports 840 (e.g., the cross supports 140; FIGS. 1A-2) by elevating members 830 (e.g., the elevating members 130; FIGS. 1A-2) to avoid having industrial products get stuck and cause backup. Sufficiently large industrial products reach the end of the screener apparatus 800 without falling through, and can be dropped into, for example, a loading truck.

Small industrial products fall through the screening members 820 and hit a waste shield 880. The waste shield 880 is configured to direct small industrial products that fell through away from, for example, a loading truck and toward a waste pile on, for example, the ground. The waste shield 880 can be oriented at an angle relative to the screener apparatus 800 by adjusting connectors (e.g., chains) 876.

Referring now to FIG. 8, a first pipe 890, a second pipe 894, and a support member 898 are coupled to the loading belt 875. The first pipe 890 can extend along the length of the loading belt 875 and include a first spray nozzle 892 coupled to a distal end of the first pipe 890 that extends generally downward. The first pipe 890 can be secured to the loading belt 875 using clamps or other fastening mechanisms. The second pipe 894 can extend over the loading belt 875 and include one or more second spray nozzles 896 directed toward the loading belt 875. The support member 898 provides support to and suspends the second pipe 894 over the loading belt 875. In some embodiments, the first and second pipes 894 are fluidly coupled. In other embodiments, the first and second pipes 894 are not fluidly coupled and receive fluid from separate sources.

During operation, the first and second pipes 890, 894 can be configured to carry fluid towards the first and second spray nozzles 892, 896, respectively. The first and second spray nozzles 892, 896 can be controlled to release and spray the fluid. The fluid carried through the first and second pipes 890, 894 can be the same type of fluid or different types of fluid. For example, the first spray nozzle 892 can be directed downward towards a railcar (not shown) to coat the walls of the railcar. The fluid can be selected to reduce or prevent sticking of coke products with the walls of the railcar (e.g., a deicing fluid). In some embodiments, the railcar is slowly moved relative to the loading belt 875 such that all or a large portion of the railcar walls can be coated with the fluid while the first spray nozzle 892 remains stationary relative to the loading belt.

In another example, the second spray nozzle 892 can be directed downward towards coke products being transported on the loading belt 875. The fluid can be selected to reduce or prevent the coke products from freezing or otherwise sticking together (e.g., a deicing fluid). In the illustrated embodiment, the second pipe 894 is positioned at a generally intermediate position along the length of the loading belt 875. In other embodiments, the second pipe 894 is positioned elsewhere along the length of the loading belt 875, such as at the end of the loading belt 875 proximate the screener apparatus 800 such that the fluid is sprayed onto the coke products as they come off of the loading belt 875.

IV. Conclusion

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below as numbered clauses (1, 2, 3, etc.) for convenience. These are provided as examples and do not limit the present technology. It is noted that any of the dependent clauses may be combined in any combination, and placed into a respective independent clause. The other clauses can be presented in a similar manner.

1. A screener apparatus, comprising:
a screening member extending along a first axis, wherein the screening member is positioned to make contact with a material to be screened;
an elevating member extending along the first axis, wherein the elevating member is coupled to a lower portion of the screening member; and
a cross support extending along a second axis angled relative to the first axis, wherein the cross support is coupled to a lower portion of the elevating member.

2. The apparatus of any one of the clauses herein, wherein the screening member is a first screening member, and wherein the screener apparatus further comprises a second screening member spaced apart from the first screening member by a first distance of at least 0.1 inch and/or no more than 2 inches.

3. The apparatus of claim 2, wherein the elevating member is a first elevating member, and wherein the screener apparatus further comprises a second elevating member spaced apart from the first elevating member by a second distance that is greater than the first distance.

4. The apparatus of any one of the clauses herein, wherein the screening member comprises a rod with a circular cross-sectional area and the elevating member has a non-circular cross-sectional area.

5. The apparatus of any one of the clauses herein, wherein the screening member comprises a circular or spherical shape, an ovular shape, or a triangular shape.

6. The apparatus of any one of the clauses herein, wherein the screening member comprises stainless steel and/or a smooth surface.

7. The apparatus of any one of the clauses herein, wherein a cross-sectional dimension of the screening member is 0.5-1.5 inches.

8. The apparatus of any one of the clauses herein, wherein a cross-sectional dimension of the elevating member is less than a cross-sectional dimension of the screening member.

9. The apparatus of any one of the clauses herein, wherein the first axis is perpendicular to the second axis, and wherein the screening member and the elevating member are disposed at an angle of at least 10 degrees relative to a direction of gravity.

10. The apparatus of any one of the clauses herein, further comprising a first side wall and a second side wall, wherein the cross support extends from the first side wall to the second side wall.

11. The apparatus of any one of the clauses herein, further comprising a flap disposed over the screening member and configured to decrease a velocity of the material to be screened when traveling over the screening member.

12. The apparatus of any one of the clauses herein, wherein the screening member is one of a plurality of screening members and the elevating member is one of a plurality of elevating members.

13. The screener apparatus of any one of the clauses herein, wherein the elevating member is coupled to the lower portion of the screening member via fasteners and/or welding, and/or the cross support is coupled to the lower portion of the elevating member via fasteners and/or welding.

14. The apparatus of any one of the clauses herein, wherein the elevating member is fixedly coupled to the screening member along an entire length of the screening member.

15. A device for screening industrial products, comprising:
a filtering device comprising a plurality of screening elements and a cross support coupled to at least some of the plurality of screening elements, wherein:
each of the plurality of screening elements includes a first portion and a second portion coupled to a lower region of the first portion,
the first portion has a first cross-sectional dimension and the second portion has a second cross-sectional dimension less than the first cross-sectional dimension, and
each of the plurality of screening elements is spaced apart from an adjacent screening element by at least 0.1 inch or 0.5 inch.

16. The device of any one of the clauses herein, wherein each of the first portions of the plurality of screening elements is spaced apart from an adjacent first portion by a first distance, and wherein each of the second portions of the plurality of screening elements is spaced apart from an adjacent second portion by a second distance greater than the first distance.

17. The device of any one of the clauses herein, wherein the plurality of screening elements is disposed at an angle of 30-80 degrees relative to a direction of gravity such that the industrial products travel over the plurality of screening elements due to gravity.

18. The device of any one of the clauses herein, wherein the plurality of screening elements is configured to allow a portion of the industrial products to fall in between individual screening elements when traveling over the plurality of screening elements.

19. The device of any one of the clauses herein, wherein the second portion is configured to separate the first portion and the cross support by a distance of at least 1 inch such that the materials traveling over the plurality of screening elements do not contact the cross support.

20. A method of screening a material, comprising:
providing a filtering device including a plurality of screening elements and a cross support coupled to at least some of the plurality of screening elements, wherein each of the plurality of screening elements includes a first portion and a second portion coupled to a lower region of the first portion, wherein the first portion has a first cross-sectional dimension and the second portion has a second cross-sectional dimension less than the first cross-sectional dimension, and wherein each of the plurality of screening elements is spaced apart from an adjacent screening element by a distance of at least 0.1 inch or 0.5 inch; and
contacting the plurality of screening elements with the material.

21. The method of any one of the clauses herein, further comprising angling the plurality of screening elements perpendicular to the cross support and/or at an angle of at least 10 degrees relative to a direction of gravity.

22. The method of any one of the clauses herein, further comprising sliding the material over the plurality of screening elements such that a portion of the material falls in between individual screening elements.

I claim:

1. A device for screening industrial products, comprising:
a filtering device comprising a plurality of screening elements and a cross support coupled to at least some of the plurality of screening elements, wherein;
each of the plurality of screening elements includes a first portion and a second portion coupled to a lower region of the first portion,
the first portion is made of metal and has a substantially circular cross-section,
the first portion has a first cross-sectional dimension and the second portion has a second cross-sectional dimension less than the first cross-sectional dimension, and
each of the plurality of screening elements is spaced apart from an adjacent screening element by at least 0.1 inch;
a waste shield coupled to a distal edge of and positioned underneath the filtering device wherein each of the filtering device and the waste shield is configured to be oriented at a non-horizontal angle, and wherein the waste shield is configured to direct small industrial products falling through the filtering device toward a waste pile;
a loading belt positioned at or adjacent to a proximal edge of the filtering device;
a first pipe extending along a length of the loading belt;
a first spray nozzle coupled to a distal end of the first pipe, wherein the first spray nozzle is configured to spray a deicing fluid onto the small industrial products directed toward the waste pile by the waste shield;
a second pipe in fluid communication with the first pipe; and
a second spray nozzle coupled to the second pipe, wherein the second spray nozzle is configured to spray the deicing fluid onto industrial products carried by the loading belt.

2. The device of claim 1, wherein each of the first portions of the plurality of screening elements is spaced apart from an adjacent first portion by a first distance, and wherein each of the second portions of the plurality of screening elements is spaced apart from an adjacent second portion by a second distance greater than the first distance.

3. The device of claim 1, wherein the plurality of screening elements is disposed at an angle of 30-80 degrees relative to a direction of gravity such that the industrial products travel over the plurality of screening elements due to gravity.

4. The device of claim 1, wherein the plurality of screening elements is configured to allow a portion of the industrial products to fall in between individual screening elements when traveling over the plurality of screening elements.

5. The device of claim 1, wherein the second portion is configured to separate the first portion and the cross support by a distance of at least 1 inch such that the industrial products traveling over the plurality of screening elements do not contact the cross support.

6. A method of screening a material, comprising:
providing a filtering device including a plurality of screening elements and a cross support coupled to at least some of the plurality of screening elements, wherein each of the plurality of screening elements includes a first portion and a second portion coupled to a lower region of the first portion, wherein the first portion is made of metal and has a substantially circular cross-section, wherein the first portion has a first cross-sectional dimension and the second portion has a second cross-sectional dimension less than the first cross-sectional dimension, and wherein each of the plurality of screening elements is spaced apart from an adjacent screening element by a distance of at least 0.1 inch;

providing (i) a waste shield coupled to a distal edge of and positioned underneath the filtering device, wherein each of the filtering device and the waste shield is configured to be oriented at a non-horizontal angle and wherein the waste shield is configured to direct small industrial products falling through the filtering device toward a waste pile, (ii) belt positioned at or adjacent to a proximal edge of the filtering device, (iii) a first pipe extending along a length of the loading belt, (iv) a first spray nozzle coupled to a distal end of the first pipe, wherein the first spray nozzle is configured to spray a deicing fluid onto the small industrial products directed toward the waste pile by the waste shield, (v) a second pipe in fluid communication with the first pipe, and (vi) a second spray nozzle coupled to the second pipe, wherein the second spray nozzle is configured to spray the deicing fluid onto industrial products carried by the loading belt; and contacting the plurality of screening elements with the material.

7. The method of claim 6, further comprising angling the plurality of screening elements perpendicular to the cross support and/or at an angle of 30-80 degrees relative to a direction of gravity.

8. The method of claim 6, further comprising sliding the material over the plurality of screening elements such that a portion of the material falls in between individual screening elements.

* * * * *